US006973355B2

(12) United States Patent
Tisue

(10) Patent No.: US 6,973,355 B2
(45) Date of Patent: *Dec. 6, 2005

(54) ACCURATE POSITIONER SUITABLE FOR SEQUENTIAL AGILE TUNING OF PULSE BURST AND CW LASERS

(76) Inventor: J. Gilbert Tisue, 1329 Santa Cruz Dr., Minden, NV (US) 89423

( * ) Notice: Subject to any disclaimer, the term of this patent is extended or adjusted under 35 U.S.C. 154(b) by 0 days.

This patent is subject to a terminal disclaimer.

(21) Appl. No.: 10/748,231

(22) Filed: Dec. 31, 2003

(65) Prior Publication Data

US 2004/0153175 A1    Aug. 5, 2004

Related U.S. Application Data

(62) Division of application No. 09/840,726, filed on Apr. 25, 2001, now Pat. No. 6,697,683.

(51) Int. Cl.[7] ............................................. G05B 19/18
(52) U.S. Cl. ........................... 700/56; 700/57; 700/58; 700/59; 700/60; 700/61; 700/62; 700/63; 356/614; 356/3; 356/22; 356/4.06; 356/4.1; 356/138; 356/155; 342/132; 342/134; 372/9; 372/20
(58) Field of Search ............................. 700/56, 60, 64; 356/614, 3–22, 138–155, 356, 358, 399; 342/132, 134; 372/9, 20

(56) References Cited

U.S. PATENT DOCUMENTS

| | | | | |
|---|---|---|---|---|
| 3,917,930 A | * | 11/1975 | Davey et al. | 318/561 |
| 4,472,024 A | * | 9/1984 | Konomura et al. | 359/814 |
| 4,816,920 A | * | 3/1989 | Paulsen | 358/474 |
| 5,164,896 A | * | 11/1992 | Nagayasu | 700/61 |
| 5,450,202 A | * | 9/1995 | Tisue | 356/614 |
| 6,130,751 A | * | 10/2000 | Haginiwa et al. | 356/401 |
| 6,172,325 B1 | * | 1/2001 | Baird et al. | 219/121.62 |
| 6,434,173 B1 | * | 8/2002 | Tuganov et al. | 372/9 |

* cited by examiner

Primary Examiner—Anthony Knight
Assistant Examiner—Thomas Pham

(57) ABSTRACT

A positioning system including a sensor, a drive sequencer and an actuator. The sensor senses the actuator position and provides position signals to drive the sequencer which responsively computes and drives the actuator in open loop moves containing dwell intervals of position. The actuator positions a mirror or other load means to reflect an optical beam as desired. Either preprogrammed or non-repeating sequences of actuator stopping positions can be synchronized with a laser. During dwell times, mirror position accuracy better than 10 microradians is suitable for tuning $CO_2$ pulse burst or CW lasers.

10 Claims, 18 Drawing Sheets

ACCURATE POSITIONER SUITABLE FOR SEQUENTIAL AGILE TUNING OF PULSE BURST AND CW LASERS

RELATED APPLICATION

This application is a divisional application of U.S. application Ser. No. 09/840,726 filed Apr. 25, 2001 now U.S. Pat. No. 6,697,683 and entitled "An Accurate Positioner Suitable for Sequential Agile Tuning of Pulse Burst and CW Lasers". Priority is claimed thereto.

BACKGROUND

1. Field of the Invention

The present invention relates generally to techniques for sensing and adjusting the position of a movable element, and more particularly of a pivoted armature reflector for steering optical beams at high speed and with high precision through sequences of positions including dwell intervals of constant position.

2. Description of Prior Art

There are many applications for steering an optical beam with high speed and precision between angular directions in either a random or a predetermined sequence. Agile beam steering in two dimensions permits successively illuminating targets in a number of locations to reflect the beam for subsequent detection by an optical receiver.

Agile tuning of lasers require sensors with a high speed-accuracy product. High accuracy is achievable with charge-coupled-devices (CCDs) and interpolation but readout is slow. On the other hand, position sensitive detectors (PSDs) and capacitive position sensors easily achieve the speeds required of the fastest pulse lasers but suffer long term accuracy and stability. Since tuning accuracy requirements are absolute ones, system configurations must be selected to achieve the tuning accuracy in spite of the slow speed sensors.

Tunable lasers typically include an intracavity diffraction grating and a rotatable mirror. The wavelength of such lasers is tuned by adjusting the angle of incidence of the laser cavity beam against the diffraction grating. Such intracavity tuning requires very high accuracy and stability. Tuned $CO_2$ lasers, for instance, require an angular range of typically 0.2 radians and an accuracy of 10 $\mu$radians. This represents a range to accuracy ratio of 20,000. In some cases, and at lower accuracy, an optical parametric oscillator (OPO) material (usually a crystal with highly non-linear optical properties) is used.

In the crudest implementations, grating reflection angles have conventionally been adjusted by grating alignment micrometer screws. Manual micrometer adjustment is slow and severely restricts beam steering agility. Automated micrometer adjustment by stepper motor is hindered by the angular momentum of the diffraction grating, backlash, screw friction, and other forces.

Laser radar (LIDAR) systems can be used to transmit different wavelengths of light into airborne suspensions (such as smog or poison gasses) which have differing reflectivities or absorption to different wavelengths. The reflected light intensity is then measured for remote spectrographic analysis of suspension samples. In remote spectroscopy LIDAR applications it is advantageous to maximize the stability and repeatability of the output at each different wavelength. On the other hand, it is very advantageous to minimize intervals between transmitting wavelengths in order to reduce measurement interference by relative motion between the LIDAR unit, the intervening atmosphere and the suspension sample. Maximum accuracy is achieved by successively transmitting different wavelengths at the laser's maximum cyclic rate.

LIDAR system laser formats can consist of single wavelength high power pulses in a sequentially repeating pattern of wavelengths. Another class of applications require a pulse burst of multiple pulses at a given wavelength, periodically repositioning to the next wavelength for another pulse burst. Alternately the tuning/positioning requirement is for a dwell time of a CW (continuous wave) laser periodically repositioning for repeating dwell times of CW operation at other wavelengths. Thus, several types of laser formats have been used to sequentially transmit multiple wavelengths; single pulse, single wavelength pulse burst and CW. The latter two require a dwell or hold time at each wavelength.

FIG. 1 shows typical timing of these formats. Waveform 40a shows single pulse timing with a pulse at wavelength $\lambda_0$ followed by one at wavelengths $\lambda_1$ and $\lambda_2$ finally repeating $\lambda_0$ for a continuous pattern of three wavelengths. Dwell time for this case can be quite short. Waveform 40b is pulse burst laser timing where a burst of pulses at wavelength $\lambda_0$ is output, separated by a retuning time for the next pulse burst at wavelength $\lambda_1$. Finally waveform 40c is a CW laser output at wavelengths $\lambda_0$, $\lambda_1$ and $\lambda_2$ separated by the retuning intervals. Tuning stability for the pulse burst and CW lasers must be maintained during the dwell times, typically shown as the interval between times 41 and 42 in FIG. 1. The present invention is aimed at systems requiring a significant dwell but has applications for the single pulse type as well.

FIG. 2 and FIG. 1, positional waveform 40d, illustrate an example of prior art which can provide limited multiwavelengths with dwell times. Here a separate laser is used for each wavelength. In this example, laser 27 at wavelength $\lambda_0$, laser 29 at wavelength $\lambda_1$ and laser 31 at wavelength $\lambda_2$ are selected to the output beam 25 by flip mirror 33 driven by actuator 35 and conventional servo or stepper 37. Actuator 35 can be a low accuracy device since it simply controls the pointing of the output beam. The individual laser output power and stability are set by the accurate internal optics of lasers 27, 29 and 31. This approach suffers from the high complexity and poor flexibility of having an entire laser for each wavelength, since there are upwards of 100 possible wavelengths in the $CO_2$ lasing spectrum. Chemicals may not be detected very efficiently with the limited repertoire of wavelengths that practicality dictates. In order to reliably detect a single chemical, 3 to 10 wavelengths may be required and other chemicals use their own unique set of wavelengths.

In FIG. 3 of the prior art, an intracavity conventional servo implementation is shown. Intracavity beam 74 is tuned by rotating mirror 76 which responsively changes the incidence angle of grating 72 thereby selecting lasing wavelength. Mirror 76 is rotated by actuator 78 in response to control by servo control 82. Mirror position is sensed by position sensor 79 then combined with desired position data 81. Servo control 82 provides output drive to actuator 78 responsive to the desired position data 81 and the actual position information from position sensor 79. FIG. 1 waveform 40e shows the required angular function. For CW or pulse burst tuning of $CO_2$ lasers, mirror 76 must have sufficient accuracy from time 41 to time 42 to satisfy the power stability requirements of the laser or approximately 10 $\mu$radians. The prior art is replete with high performance servo techniques for servo control 82 and sensors for position sensor 79. In order to enhance speed and stability, the servo techniques aim to keep the actuator drive high as it approaches its final position and to compensate for the delays inherent in sensors and actuator/load inertias. These techniques, to name a few, involve lead-lag networks, phase compensation, error integration, gain switching, open loop/closed loop switching, dither, observer models, velocity and acceleration feedback and mode switching. Conventional servos, to date, have been unable to satisfy either the single pulse applications or the CW/pulse burst applications for $CO_2$ LIDAR systems. Although such arrangements as FIG. 3 can easily satisfy either the speed or accuracy required by the typical laser tuner, limitations prevent satisfying both. Sensor 79 implemented with PSDs or other high speed position sensing techniques are adequately fast but lack the required accuracy for tuning lasers. FIG. 1 waveform 40*i* illustrates the positional drift. When sensor 79 is implemented using interpolated CCD technology for adequate accuracy, none of the servo speed enhancements satisfy the 200 Hz and up tuning speed requirements.

FIG. 4 of the prior art represents related U.S. Pat. No. 5,450,202 which discloses an adaptive resonant positioner capable of single pulse tuning and with some capability for CW or pulse burst tuning. As disclosed, high accuracy and speed are combined as a result of the adjustment of adjacent pairs of drives on a pattern delayed basis. Mirror 66 position is sensed by pulsed reference laser 92 and CCD 98 in sensor 52 in response to timing pulse 80 and sensor processing and interpolation 114. Actual sensed position 88 is used via drive control 54 together with pattern information 198 to drive resonant actuator 56 via drive line 90 to substantially stop at precise positions for firing the pulsed laser, not shown. This results in accurately tuned adjacent laser firing angles separated by angular half periods of damped sinusoidal motion. In a first, pulsed burst/CW mode, multiple patterns each consisting of a single wavelength are used. Since adjacent laser firing angles are separated by sinusoidal transitions of zero amplitude in this case, tuning to that pattern's wavelength is continuous. Sequentially switching single wavelength patterns then result in an equivalent multiwavelength pattern. FIG. 1 positional waveform 40*f*, represents this approach, where pattern switching is typically shown by the time interval 42 to 43 and the tuning dwell time typically by interval 44 to 45. Tuning will be invalid for an interval after pattern switching, typically shown by interval 43 to 44, while the new pattern is adapted or learned. The time interval 42 to 43 is ½ the actuator resonance as disclosed. A degree of success has been achieved with this technique but it is limited by the learning and pattern switching speed and thus the sequencing of laser wavelengths of hundreds of hertz is difficult.

The related U.S. Pat. No. 5,450,202, in a second and faster pulsed burst/CW mode, has sequential wavelength tuning with dwell intervals shown by FIG. 1 positional waveform 40*g*. In this mode, the agile tuner executes a single pattern which contains two or more adjacent identical wavelengths for each dwell interval required. In theory, time intervals typically shown as 41 to 42 would again be sinusoids of zero amplitude. In practice, even though the actuator including its load may be well characterized, a number of factors cause the angular function between the tuned wavelength positions to depart as shown exaggerated by dashed line 40*h*. These factors are excited by the transition drive in between dwell intervals and include among other things torque nonlinearities, hysteresis, parameter thermal variations, damping uncertainties and resonance frequency errors. Thus, tuning in the general case, is not accurate enough between the firing positions under control of the resonant tuner feedback loops. This technique is notably faster in that wavelength switching is accomplished in only ½ of a resonant interval shown typically as the interval 42 to 44. Although tuning might be adequate for OPOs, for instance, it would be difficult to characterize the actuator/load sufficiently accurately to reach $CO_2$ laser tuning accuracy.

Conventional optical element positioning systems have been unable to perform accurate high rate optical beam tuning for sequentially addressed CW or pulse burst lasers requiring optical elements in the cavity to be stationary during the active dwell time and then to jump quickly and precisely to the next position in a sequence.

BRIEF SUMMARY OF THE INVENTION

In accordance with the present invention, an agile positioner comprises a load position sensor, a load driving actuator and a drive sequencer means for driving the load rapidly and accurately to a desired position by isolating, in time, the sensing and drive functions.

Objects and Advantages

It is a primary objective of the present invention to rapidly position an actuator for dwell periods with high precision suitable for CW lasers and for pulse lasers requiring bursts of pulses at a constant wavelength.

It is another objective to enable an adaptive resonant positioner to track dwell times more closely.

It is another objective to provide improved positioning speed while utilizing accurate but slow speed position sensors.

It is another objective to allow the combination of high accuracy feedback loop, high transition speed and slow speed sensor.

It is another objective to further improve positioning speed and accuracy by utilizing adaptive algorithms when wavelengths repeat in patterns.

It is another objective to better utilize the torque of an actuator.

It is another objective to control the shape of the transitions.

It is another objective to position non-linear optical crystals.

It is another objective to successively reposition an optical reflector to steer a light beam in desired directions.

It is another objective to provide an improved laser tuner.

For a given technology, cost and complexity, sensors follow a law similar to the Heisenberg uncertainty principle of atomic physics. For sensors, the more accurately the position is measured, the less may be known about where it is at the end of the measurement. In dynamic closed loop operations, long sensor delays cause instabilities which must be dealt with in either the frequency or time domains, invariably by slowing down the overall acquisition speed. The effect gets worse as the required accuracy increases because the loop gain must increase. In a sense the problem stems from trying to coordinate the delayed position information with the need to drive the actuator efficiently without really knowing where it is. The typical result is a severe reduction in drive as the target position is approached so that periods of overshoot or undershoot can be reduced or prevented. The present invention, isolates the sensing delay from the drive execution by performing them separately with sensing occurring at a time when the velocity is substantially zero. In addition, motion of the actuator, once started, occurs in pure open loop fashion without regard to sensor output. This type of operation is made more effective by the highly predictable nature of some actuators such as galvanometers in low friction environments. Galvanometers can have repeatabilities below 1 µradian and high torque predictabilities.

Preferred embodiments of a positioning system according to the present invention includes sensor means, drive sequencer means and actuator means. Actual positions of an optical element or a mirror are sensed and resolved by sensor means preferably including lighting means for emitting light to be reflected by the mirror, optical detector means for detecting the intensity distribution of the reflected light and producing an intensity sample waveform and interpolating means for resolving sample waveform values to provide interpolated actual position values. The actual position values, measured when actuator means is substantially stopped, are fed to a drive sequencer means preferably including memory means for storing desired position information including possible dwell intervals of constant position and for storing drive control information, error determining means for determining differences between the desired and actual mirror positions at given times and open loop sequence computing means for modifying and storing adaptive and non-adaptive drive control sequences for later use to control an actuator to reposition the mirror closer to the desired positions. Open loop sequences as used in this specification are torque or force functions of time, meeting boundary conditions of position and velocity, varying in amplitude, timing and/or polarity but not affected by position measurements once started.

In a first preferred embodiment, a drive sequencer means is used to modify the actuator drive of an adaptive resonant positioner as disclosed in related U.S. Pat. No. 5,450,202 or an equivalent positioner. The adaptive resonant positioner, operative on a resonant load, provides a sensor and drive control capable of positioning an actuator including low accuracy dwell intervals of constant position as described in the prior art of FIG. 4. The positioner is modified to provide one or more additional actual position signals in between resonant points normally required for operation of the resonant positioner. These additional actual positions are used by the drive sequencer to compute and adapt to provide improved drive information to cause the actuator to more closely track a constant position during periods of dwell programmed into the resonant positioner by repeating the same desired position in successive positions of the pattern. The improved drive information is an open loop sequence format and is algebraically added to the actuator drive provided by the resonant positioner in such a way that the positioner's normal pulse laser operation is substantially unaffected at the points of loop closure but that closer tracking of the desired position occurs in the interval between. Boundary conditions on the open loop sequence are that no net position or velocity change appears at the normal resonant positioner lock points.

In a second preferred embodiment, a non-resonant actuator is sensed by a position sensor to provide actual position signals. A drive sequencer receives real time desired position data or data in the form of a pattern to be repeated and compares actual position data with desired position data. It computes open loop sequences of drive for positioning during transition and dwell times of the input pattern. Open loop sequences are computed based on position errors and an accurate model of the actuator and load. Loop stability at high speed is achieved by performing position sensing when the actuator and load are substantially stopped, maintaining an accurate model of the actuator and load and functionally ignoring the sensor output while moving the actuator in its open loop moves. Open loop sequences are applied to a non-resonant actuator which preferably has the characteristics of high repeatability, low friction and predictable torque characteristics for stability and rapid positioning. Operation generally proceeds in positioner cycles consisting of a position measurement followed by an open loop sequence move. Boundary conditions on the open loop sequence moves are that position change equal the position error and final velocity equal zero.

A third preferred embodiment has the basic form of the second embodiment except that the desired position data is always in the form of a fixed or slowly changing pattern to be repeated and one or more of the positioner cycles within a position of the pattern is adaptively modified for more rapid transition between positions of the pattern. Adaptive open loop sequences are computed based on the drive just used, current position error and an accurate model of the actuator and load. Adaptive sequences are executed on the next pattern. Boundary conditions are the same as for the second embodiment.

Among the advantages of the invention is that accurate but slow speed sensors, such as CCDs, can be used to determine fast open loop moves for a tight loop without introducing loop instabilities. Interpolated CCD sensors, for instance, can have pulsed illumination resulting in equivalent sensing aperture bandwidths in the MHz range, but when used in conventional feedback systems, readout delays cause closed loop bandwidths in the kHz range. The invention also has utility in less accurate positioning applications which require extremely high repositioning rates. Another advantage is that open loop moves allow for setting actuator transition rates and shapes independent of stability. Once locked onto a repeating pattern of relatively unchanging desired positions, the invention can successively reposition and stop the armature at actual positions including dwell times of constant position within, for example, 1 part in 20,000 of the desired positions. These and other objects of the present invention will become apparent to those skilled in the art upon reading the following detailed disclosure of the preferred embodiments as shown in the several views of the drawing.

DETAILED DESCRIPTION OF THE INVENTION

(A) General

Figure 5:
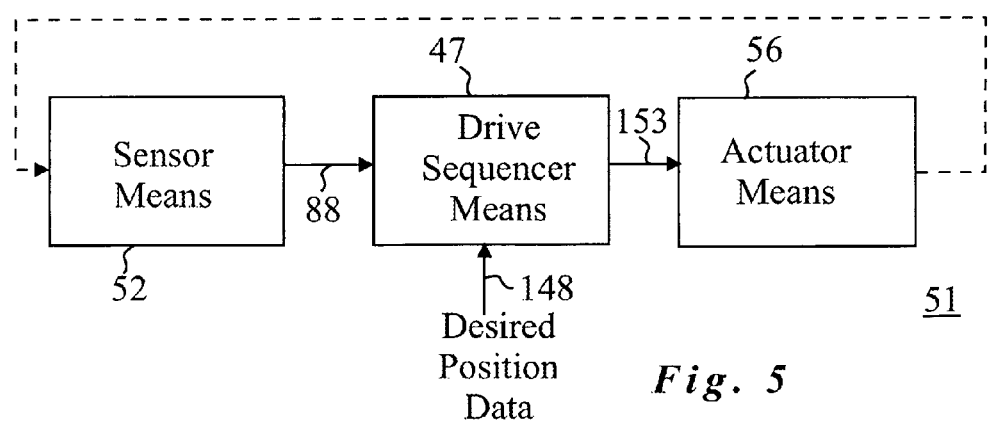
FIG. 5 is a block diagram showing the present invention.

Referring to FIG. 5, an agile positioning system 51 according to the present invention includes a sensor means 52, a drive sequencer means 47 and an actuator means 56.

Actuator means 56 is preferably a galvanometric actuator of a low friction type whose torque and load characteristics are well defined. Actuator means 56 is rigidly attached to a load, such as a mirror, and is typically used along with a grating as an intracavity agile tuner.

Actuator means 56 is positionally monitored by sensor means 52. Sensor means 52 preferably utilizes a CCD as a multielement photodetector responding to a preferably pulsed illumination source as it is redirected by an optical element attached to the actuator 56. CCD sensors in this application have the characteristics of low smear, short aperture time and high accuracy and perform the sensing function while the actuator is substantially stopped.

Drive sequencer means 47 compares actual position information 88 from sensor 52 with desired position data 148 and uses an actuator/load model to compute and execute open loop sequences 153 applied to actuator 56.

In operation, positioning system 51 executes cycle pairs of actual position measurement and open loop sequence executions. At positions of substantially zero velocity, sensor means 52 is triggered to perform a position measurement and begin readout. When actual position information has been read, drive sequencer means 47 compares desired position data 148 with appropriate actual position data 88 and generates a position difference. Then, using the position difference and a model of the actuator and load, computes an open loop drive sequence move designed to rapidly move the actuator nominally to the desired position, terminating in zero velocity. In some embodiments, adaptive operation uses the drive just executed and the position difference to modify stored open loop sequences. In all embodiments, isolation between sensor operation and actuator motion, a necessary condition for stability without compensation, is achieved by using appropriately narrow aperture position sensing when the actuator is substantially stopped.

Figure 6:
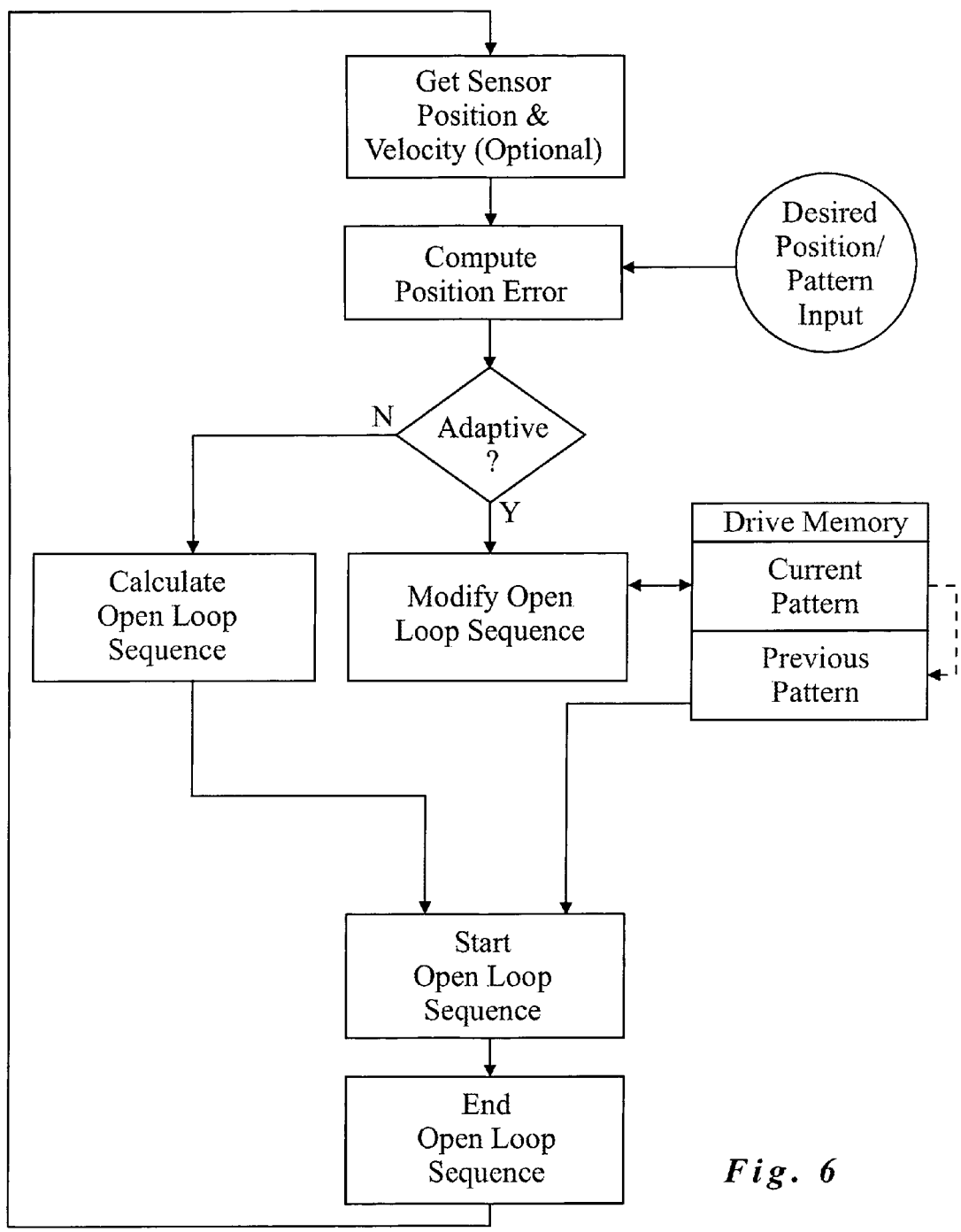
FIG. 6 is a flow chart describing the general operation of the present invention.

FIG. 6 is a flow chart reflecting the operation of FIG. 5. In FIG. 6, the sensor first outputs actuator position. For some preferred embodiments an optional velocity is read by utilizing a second sequential position read, and then used as a velocity term in the computations for faster loop closure. Position error is then computed. Calculation of a new open loop sequence proceeds directly for the case of non-adaptive cycles. Otherwise for adaptive cycles, modification of stored drive information for the current pattern (N) occurs and the new open loop sequence comes from a previous pattern's modified and stored value. Finally, execution of the open loop sequence occurs, leaving the actuator in a position substantially equal to the desired position, with substantially zero velocity and ready for the next cycle. The more precisely the system conforms to the mathematical actuator/load models and the boundary conditions on the open loop sequences, the fewer cycles or iterations will be necessary to achieve a given lock accuracy or track changes in desired position data.

(B) Resonant Agile CW Positioner

System

Figure 7:
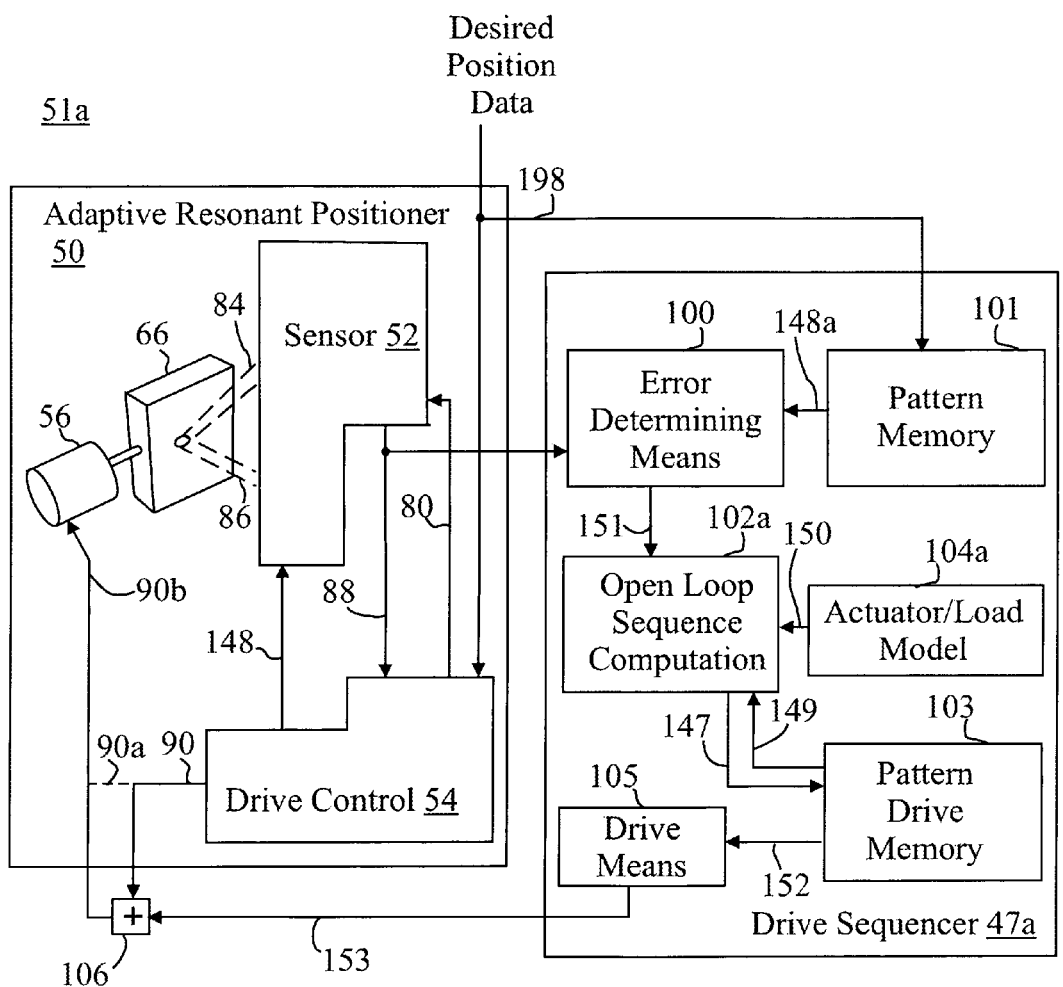
FIG. 7 is a diagram of a first preferred embodiment of the present invention.

Referring to FIG. 7, an agile positioning system 51a according to the present invention in a first preferred embodiment includes an adaptive resonant positioner 50 or equivalent positioner, a drive sequencer means 47a, a source of desired position data 198 and a drive adder 106. In this embodiment, sensor means 52 and actuator means 56 of FIG. 5 are substantially combined as adaptive resonant positioner 50 of FIG. 7. Desired position data 198 contains both resonant positions to be visited or locked by adaptive resonant positioner 50 and correction positions to be visited or locked by drive sequencer 47a.

Adaptive resonant positioner 50 preferably and substantially comprises the positioner disclosed in related U.S. Pat. No. 5,450,202. As disclosed, desired resonant position data included in signal 198 supplies pattern information defining actuator positions to be resonantly and periodically visited. Actuator drive 90 as disclosed, is directly connected to actuator 56, shown as lines 90, 90a and 90b. For this embodiment, drive adder 106 having a first input 90 and a second input 153 is connected to supply drive to actuator 56 on output line 90b. The first adder 106 input is connected to resonant drive signal 90, the output of drive control 54, and the second adder input is connected to correction drive 153, the drive sequencer 47a output. Drive control 54 output connection to actuator input 56 is physically disconnected by removing connection segment 90a. In this way, adaptive resonant positioner 50 is connected as disclosed but with a small modification of actuator 56 drive 90 for accuracy improvement by drive sequencer 47a output 153. Sensor 52 output 88 of adaptive resonant positioner 50 is connected to supply actual position information to drive sequencer 47a and to provide additional actual position measurements as required. Drive sequencer 47a receives desired position data 198, actual position data 88 and outputs corrected drive 153 for modification of adaptive resonant positioner 50 actuator drive 90.

Figure 1:
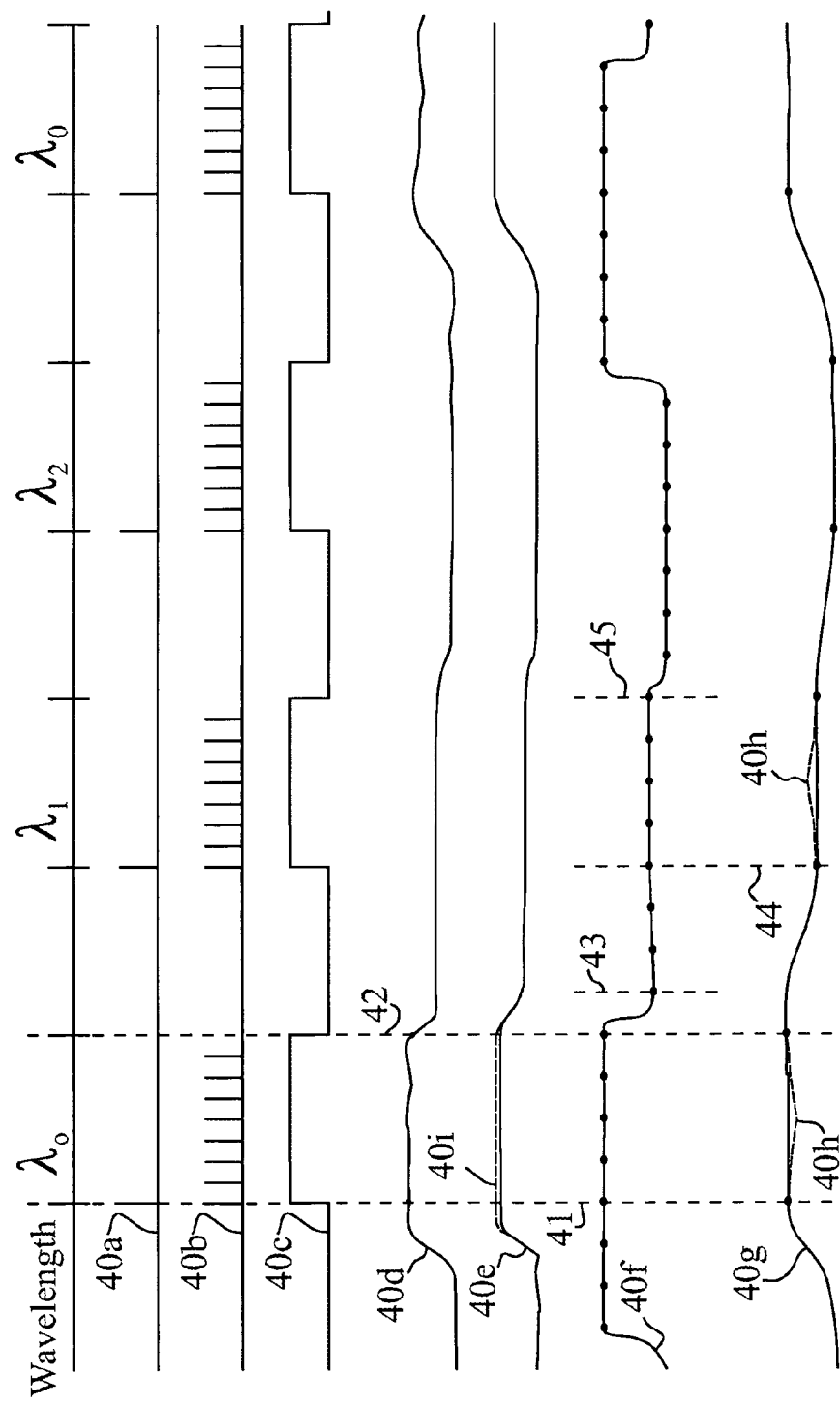
FIG. 1 is a timing diagram of various techniques in the prior art.
Figure 2:
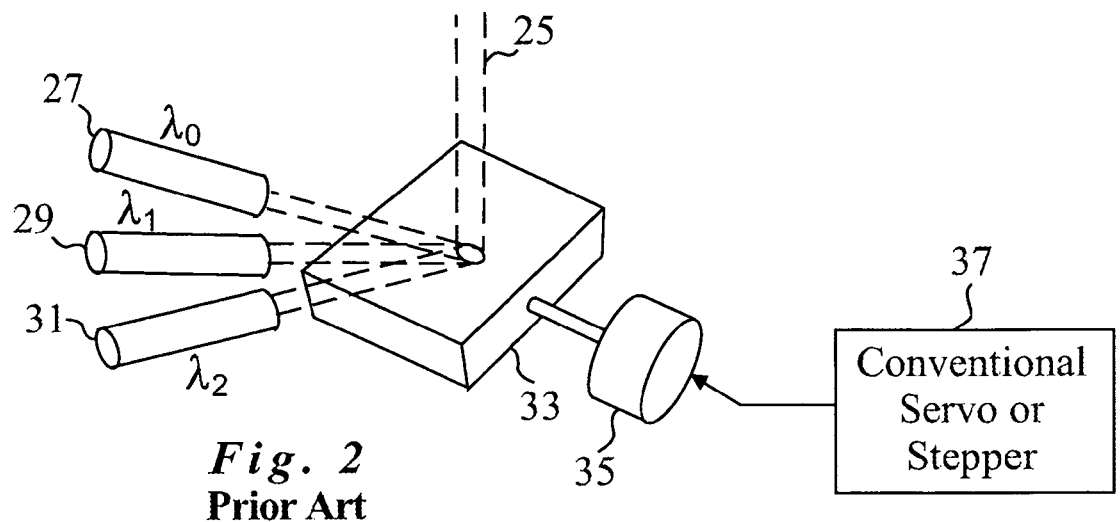
FIG. 2 is a flip mirror implementation in the prior art.
Figure 3:
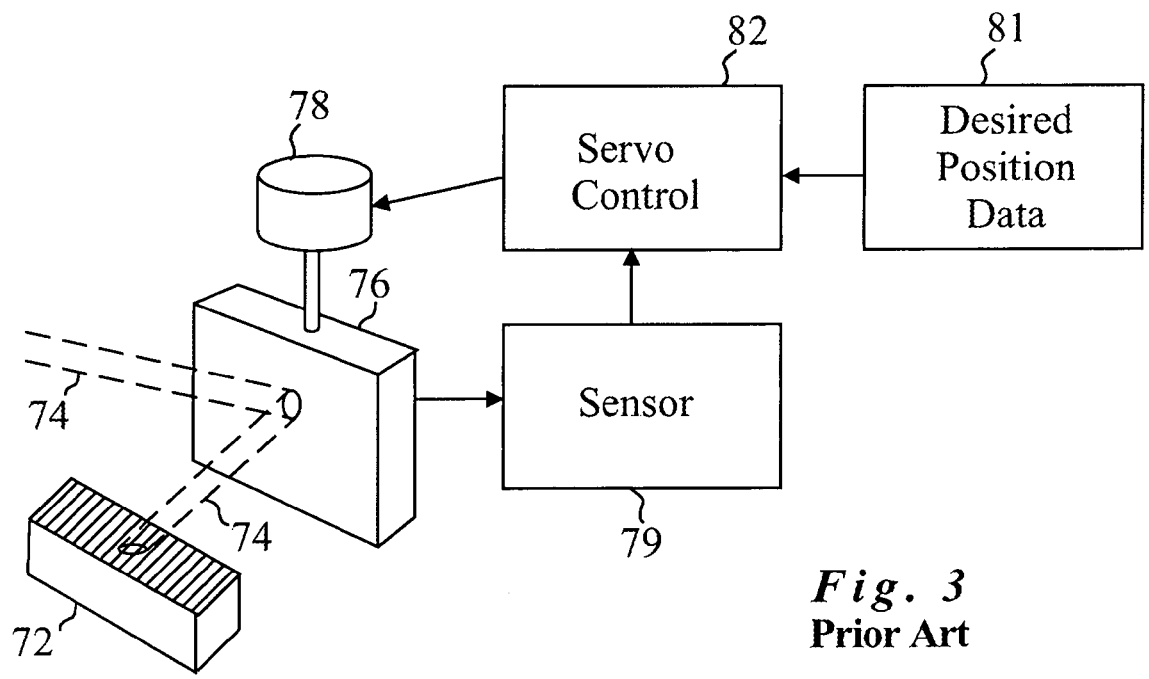
FIG. 3 is a conventional servo implementation in the prior art.
Figure 4:
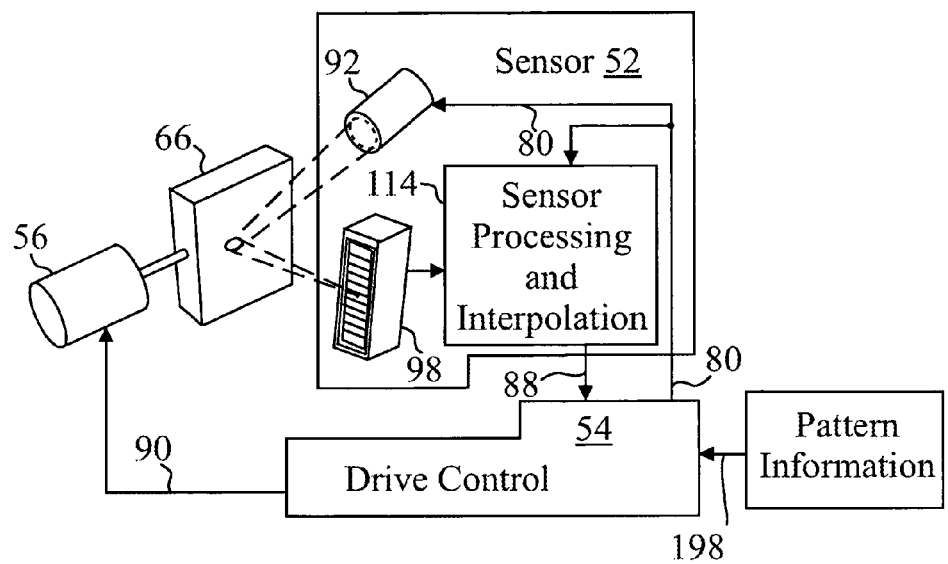
FIG. 4 is an adaptive resonant positioner as used in the prior art.

Actuator means 56 is preferably a galvanometric actuator including a resonantly moveable armature with attached optical element 66 typically a mirror. Intentional and controlled resonance of actuator 56 is typically achieved via return spring or flexure. The position of typical intracavity mirror 66, by means of its rigid connection to actuator 56, is preferably sensed by sensor means 52 operative to cause emitted light beam 84 to be reflected off sensor mirror 66 and to return as reflected light beam 86. With timing set by illumination timing signal 80, sensor means 52 detects the position of reflected beam 86 and responsively produces an actual position signal on line 88. The actual position signal is used as a feedback signal by drive control means 54 along with input line 198, containing desired position information initially or dynamically received defining a selected sequence of one to any practical number of positions to which a resonantly movable load is desired to move and pause. Drive control means 54 thereby executing algorithms to generate a first drive output on line 90. A second drive 153 is outputted by drive sequencer 47a for correcting positional anomalies in the dwell intervals represented by the difference between lines 40g and 40h in FIG. 1. The first and second drive outputs are summed in adder 106 to produce actuator drive 90b which drives actuator means 56 to reposition reflector 66 as desired. Further connectivity and operation of sensor means 52 and drive control means 54 are disclosed in related U.S. Pat. No. 5,450,202. Positioning system 51a of the present invention requires additional actual position information as will be further disclosed and as generated by intermediate illumination timing commands on line 80.

Alternate Sensor

Figure 8:
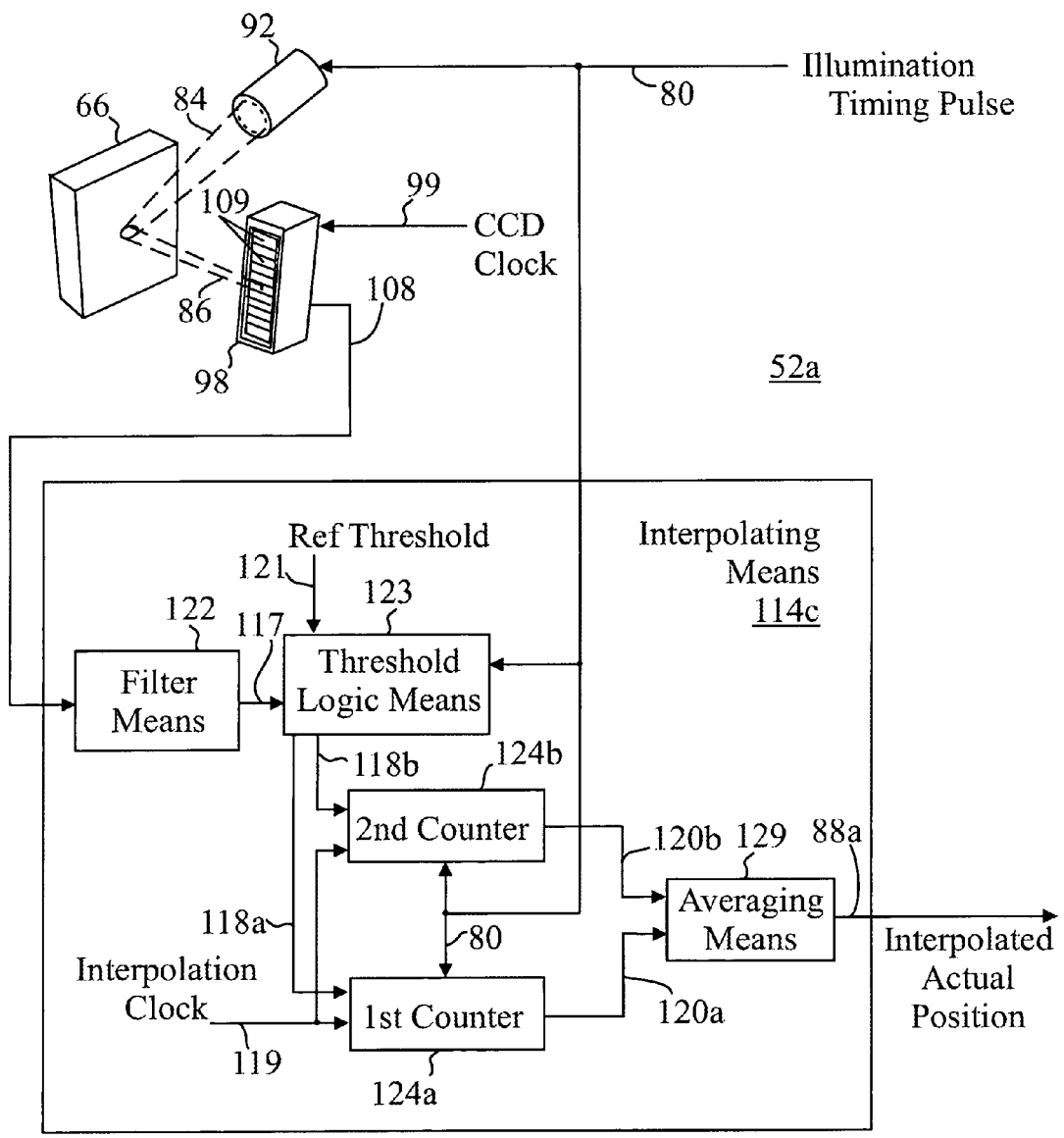
FIG. 8 is a diagram of an alternate and more preferred embodiment of a sensor to be used with some embodiments of the present invention.

Sensor means 52a of FIG. 8 is an alternate and more preferred embodiment of sensor means 52 not requiring desired position data 148 as an interpolation aid. Referring to FIG. 8, the preferred digital sensor means 52a comprises a lighting means 92 including a suitable illumination source such as a light emitting diode (LED) or preferably a laser diode focussed and arranged to radiate a beam of emitted light 84 towards movable optical reflector 66. Emitted light beam 84 impinges upon reflector 66 and, depending on the reflector's angular position, is reflected as reflected beam 86 back towards optical detector means 98. Sensor means 52a receives illumination timing signal 80 and is operative to freeze optical reflector 66 position and output interpolated actual position on 88a. In a typical system, as will be described in the preferred embodiments, system timing of sensor 52a operation is synchronized with drive sequencer 47 position measuring requirements. Pairs of actual position measurements are used in some embodiments to provide velocity data information.

Figure 9:
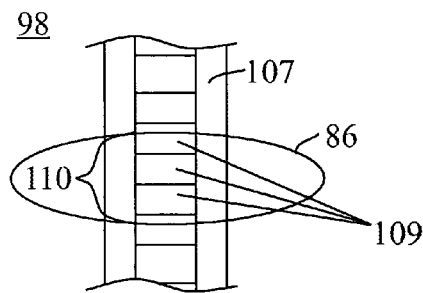
FIG. 9 shows details of the FIG. 8 optical detector means including an array of discrete photodetector elements in an area transiently illuminated by a reflected light beam.

Referring to FIG. 9, the preferred optical detector means 98 comprises an array 107 of, for example, 2048 discrete photodetector elements (pixels) such as pixels 109. Reflected beam 86 is preferably focused to illuminate an area 110 as narrow as practical and perpendicular to the length of array 107 throughout deflections of mirror 66 to always illuminate CCD pixels 109 in an area 110 somewhere along the array. Area 110 movements along array 107 due to rotations of reflector 66 are preferably monitored by providing a pulse timing signal on line 80 to energize illumination source 92 to pulse emitted beam 84 at moments of measurement interest. Pulsing beam 84 effectively freezes the mirror 66 position to be sensed with high accuracy at times when the mirror has some finite velocity. If mirror 66 moves relatively slowly around measurement moments (or positions), and if CCD array 107 is scanned at a high rate, then illumination source 92 may emit beam 84 continuously rather than in pulses.

Figure 10:
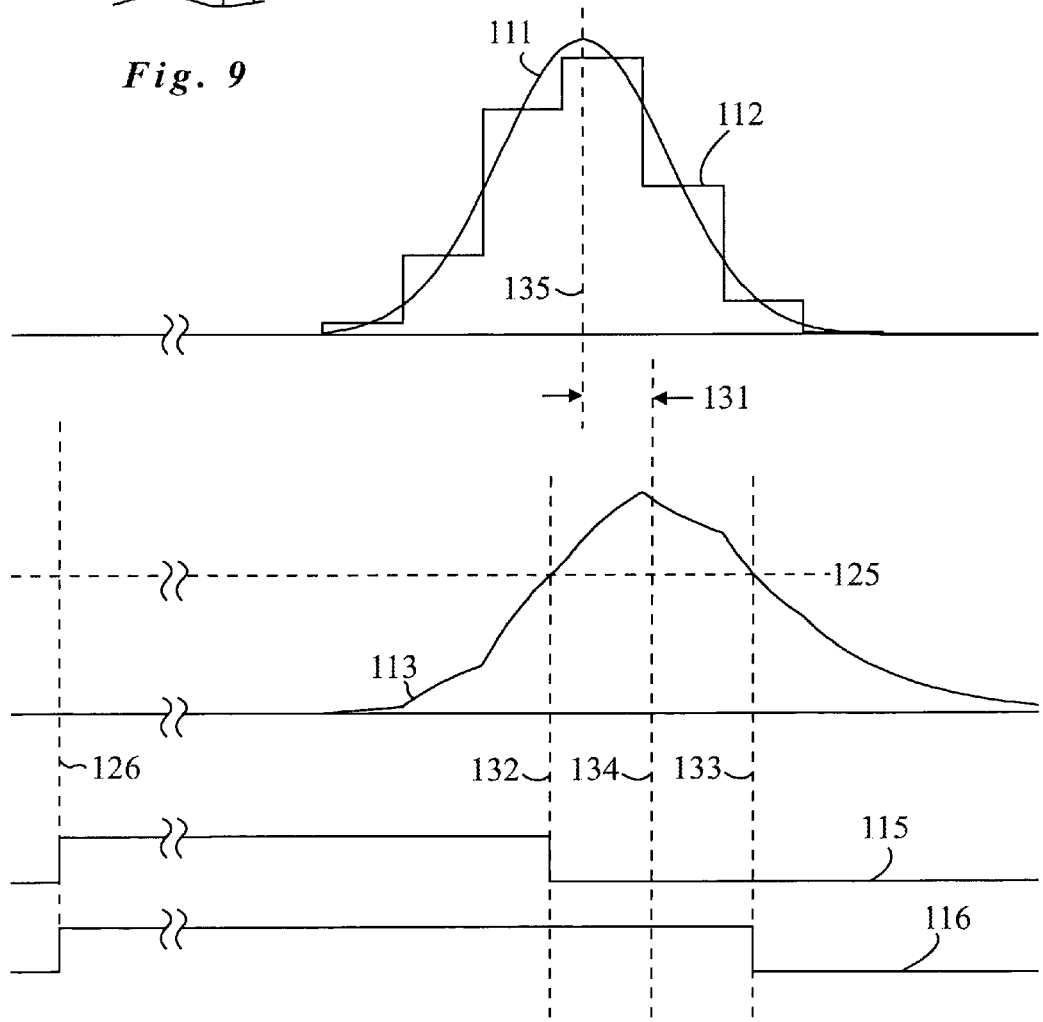
FIG. 10 is a graph showing an intensity waveform of light illuminating certain photodetector elements, a received light intensity sample waveform produced by the illuminated photodetector elements and significant waveforms used by the circuit of FIG. 8 to find an average suitable for an actual interpolated position.

Referring also to FIG. 10, area 110 receives light represented by intensity distribution waveform 111 as a function of distance along the abscissa, which is detected by illuminated elements 109. CCD array 107 is preferably scanned at a clock or pixel rate in the megahertz range and outputs on line 108 detection signals idealized for example as light intensity sample waveform 112 as a function of time along the abscissa. A number of factors in a practical implementation of the sensor as described, degrade the capability of unprocessed output 108 of a typical CCD 98. Among them are light distribution distortions, amplitude variations and focus as angles change, and the high cost and even slower readouts associated with directly useable CCD pixel lengths. The need, therefore exists to increase equivalent resolution, to smooth optical anomalies of the beam and the quantizing effects of the CCD sensor itself and finally to locate an accurate equivalent center of the beam. Fortunately, many sensor applications (including LIDAR) require precise sensing repeatability but not necessarily absolute sensing accuracy.

FIG. 8 includes interpolating means 114c to produce interpolated actual position signals on sensor output line 88a. Filter means 122, preferably a RC low pass filter, receives light intensity sampled waveform 112 on CCD output 108 set by CCD pixel clock 99 and outputs filtered intensity waveform 113 to threshold logic 123 on line 117. Threshold logic 123 receives filtered intensity waveform on line 117, a reference threshold 125 on line 121 for detecting the state of the filtered intensity waveform as being above or below the reference threshold 125 and illumination timing pulse 80 for starting a first count enable output on line 118a and for starting a second count enable output on line 118b. A first counter 124a for counting interpolation clocks receives the illumination pulse 80 as a reset or count equal zero input, a count enable 118a as a count control and an interpolation clock 119 as a counter clock and outputs a first count output on 120a. A second counter 124b for counting interpolation clocks receives the illumination pulse 80 as a reset or count equal zero input, a count enable 118b as a count control and an interpolation clock 119 as a counter clock and outputs a second count output on 120b. Averaging means 129 receives the first count output 120a and the second count output 120b and outputs a computed average on output 88a as an interpolated actual position.

In operation, interpolating means 114c receives the light intensity sampled waveform 112 of FIG. 10 and outputs a higher resolution interpolated actual position 88a representing an equivalent location of the beam. Interpolation clock 119 frequency is selected to define the increased resolution. For example, an interpolation clock 119 of r times the CCD pixel clock 99 readout rate will increase resolution by 2r times. Smoothing and quantizing noise rejection of interpolator 114c is accomplished by low pass filter 122 set for a 3 db frequency typically ½ of the CCD readout frequency. Other filter types and cutoff frequencies can produce predictably improved or poorer results.

FIG. 10 shows the result of illumination reflected beam 86 in a typical position. Waveform 111 represents the unsampled light intensity, 112 represents the CCD light intensity sampled waveform readout and 113 represents the corresponding filtered example.

Threshold logic means 123 produces two binary envelope waveforms operative as count enable signals 118a and 118b used to locate the center of the filtered intensity waveform 113. First count enable signal 118a is shown as FIG. 10 waveform 115. Second count enable signal 118b is shown as waveform 116. Both count enable outputs are placed into the count enable state by the illumination timing pulse 80, synchronous with the beginning of CCD readout, and shown as time 126 in FIG. 10. Threshold logic means 123 using a comparator operative between the filtered intensity signal 117 and reference threshold 121, drops the first count enable 118a at a first positive crossing of threshold 125 by filtered intensity waveform 113 at time 132 in FIG. 10. Threshold logic means 123 via said comparator drops the second count enable 118b at a first negative crossing of threshold 125 by filtered intensity waveform 113 at time 133. Threshold logic means 123 outputs 118a and 118b are shown in FIG. 10 as waveforms 115 and 116 respectively.

First and second count enables 118a and 118b control counting means including first counter 124a and second counter 124b in FIG. 8. Thus, first counter 124a counts interpolation clock 119 pixels over an interval from time 126 to time 132 outputting on 120a. Second counter 124b counts interpolation clock 119 pixels over an interval from time 126 to time 133 outputting on 120b. Averaging means 129 implements a simple averaging function on count outputs 120a and 120b to locate a center 134 between the crossings and outputs interpolated actual position 88a. The averaging results in an additional resolution increase of two to one. The smoothing and averaging functions produce a high degree of independence between the interpolated position and the size and shape of the illuminated area as well as the quantizing effects of a lower resolution CCD. For a 2048 CCD, an interpolation clock preferably 8 times higher than the CCD readout rate plus averaging produces an address space resolution of 32768 pixels. Other CCDs or positional resolution requirements would produce higher or lower values. Delay 131 in FIG. 10 between the intensity distribution peak at time 135 and the computed average 88a representing the final interpolated position 134 is substantially constant and a function of the low pass filter delay.

Drive Sequencer

Referring to FIG. 7, a first preferred drive sequencer 47a comprises a pattern memory 101, a pattern drive memory 103, drive means 105, error determining means 100, actuator/load model 104a and open loop sequence computation 102a.

Pattern memory 101 receives through input line 198, desired correction position data defining a pattern of correction positions preferably including one or more positions matching the dwell positions of the adaptive resonant positioner. The pattern is related to that supplied to adaptive resonant positioner 50. Pattern memory means 101 stores the pattern and sequentially supplies a current desired correction position as output 148a to error determining means 100. Error determining means 100 receives desired correction position 148a and actual position data 88 and supplies position error 151 to open loop sequence computation 102a. Open loop sequence computation 102a inputs actuator/load model information 150 from actuator/load model 104a, position error 151 from error determining means 100 and current correction drive 149 from pattern drive memory 103 and outputs modified correction drive 147 to pattern drive memory 103. Pattern drive memory 103 inputs modified correction drive 147 and outputs current correction drive 149 to open loop sequence computation 102a and current pattern drive 152 as modified and stored in a previous pattern to drive means 105. Drive means 105 output 153 provides the correction drive to adder 106.

In operation, the resonant agile CW positioner 51a of FIG. 7, a first preferred embodiment of the present invention, corrects inaccuracies in the operation of adaptive resonant positioner 50 of related U.S. Pat. No. 5,450,202, when used in a special mode for CW/pulse burst applications.

Figure 11:
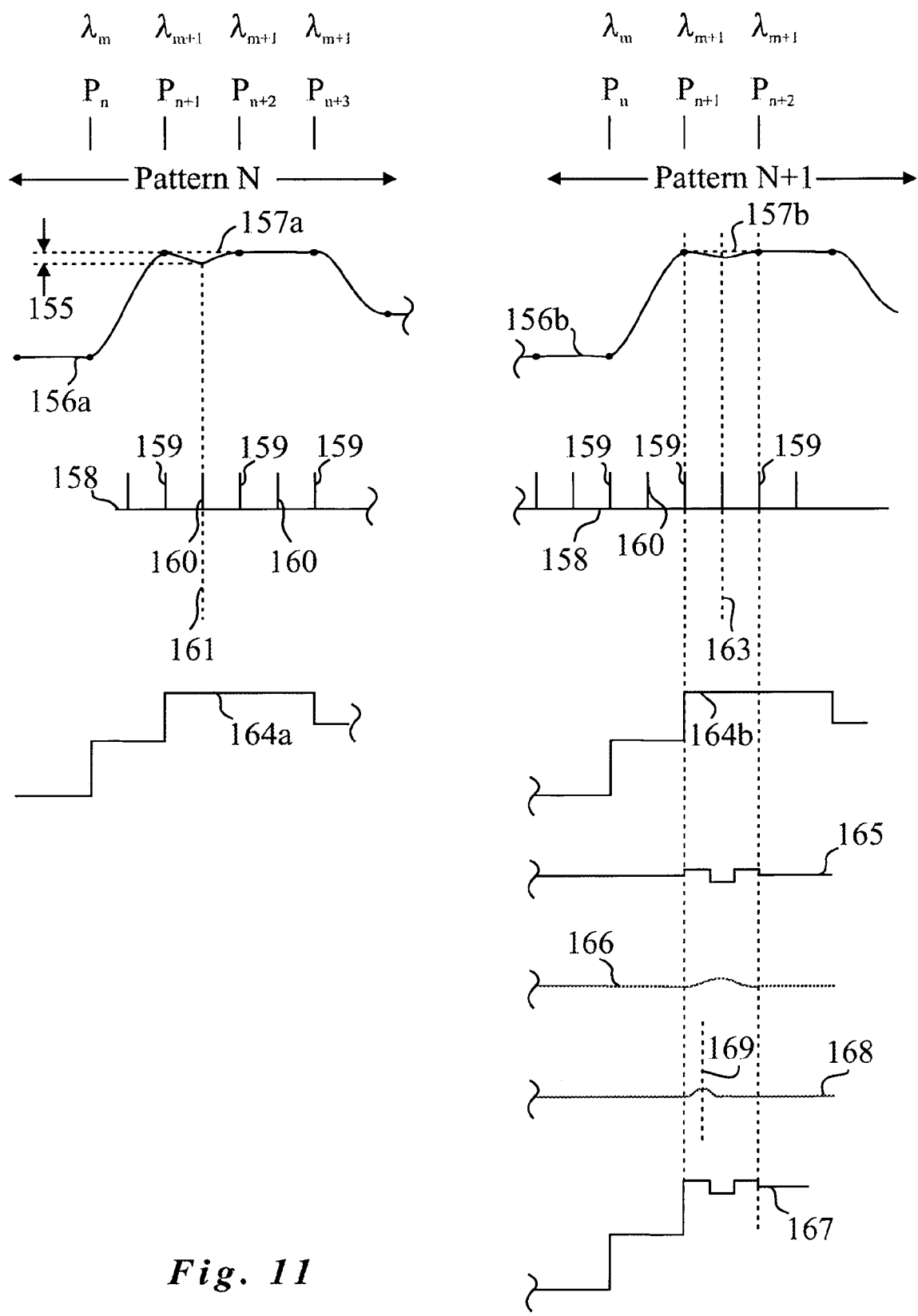
FIG. 11 is a graph showing a positional correction to a pattern example containing a dwell interval implemented with the first preferred embodiment of the present invention of FIG. 7.

Drive controllers according to said related patent disclosure use delayed feedback corrections and take advantage of relatively unchanging patterns of desired resonant positions to operate as essentially separate but overlapped feedback loops. This technique regulates resonant operation of an actuator/load and ensures positioning repeatability while optimizing actuator position transition speed. It locks feedback loops to drive an actuator/load to stop at each of the desired resonant positions at resonant instants of half-periods of the actuator/load's resonant frequency. Such a positioner when programmed for two or more identical adjacent positions, creates dwell intervals in the time domain since the tuned adjacent positions are, in theory, separated by half sinusoids of zero amplitude. An examination of harmonics in the frequency domain shows departure from the ideal. The drive techniques desirably modulate the in-phase frequency content at the resonant frequency. However, harmonics are generated by the periodic drive function, especially for large drive steps, because of various factors such as torque non-linearities, hysteresis, parameter thermal variations, damping uncertainties and resonance frequency errors. The on-frequency components are handleable by the adaptive resonant positioner. Second and higher harmonics appear as departures from the ideal in the interval between lock points as discussed relative to FIG. 1 waveforms 40g and 40h. Maximum injected energy at the second harmonic (twice resonant frequency) can be in the range of 2%. Assuming an actuator Q of 25, attenuation of the second harmonic would be down about 20 to 1, resulting in 200 μradians residual for a 0.2 radian full scale. FIG. 11 waveform 156a shows an uncorrected position trace with exaggerated error at time 161 represented by 155 and ideal trace at 157a. Adaptive resonant positioner 50 is operative to accurately lock to positions at times $P_n$, $P_{n+1}$ etc. However, because the second harmonic can have nulls at the lock points of said positioner, error 155 is not reduced by the resonant positioner, discouraging use in the CW/pulse burst modes because of insufficient accuracy.

The resonant agile CW positioner 51a of FIG. 7 substantially consists of adaptive resonant positioner 50 operating on desired resonant position data 198 to accurately lock to the resonant points $P_n$, $P_{n+1}$, etc. except for the drive sequencer 47a correction drive 153 input to drive current adder 106, modifying slightly, the drive control 54 connection to actuator 56. Since actuator 56 is substantially a linear device, and since drive control 54 is only responsive to the actuator actual position signal 88 resulting from illumination timing pulses at the resonant lock points, independence with drive sequencer 47a can be achieved by constraining open loop sequences on correction drive 153 to a boundary condition. Said boundary condition is that the actuator position and velocity as a result of correction drive 153 is zero at each resonant lock point $P_n$, $P_{n+1}$ etc. Thus adaptive resonant positioner 50 operation can be made independent of drive sequencer 47a, enabling drive sequencer 47a to modify it's output 153 to bring the position and shape of the position trace to desired accuracy between lock points. As a trivial issue, additional actual position 88 measurements are supplied to drive sequencer 47*a* by sensor 52 or preferably sensor 52*a* at any desired points or correction instants where the position trace in between resonant lock points is to be corrected.

Drive sequencer 47*a* is operative to receive desired correction position information included in signal 198 in the form of patterns and to receive actual position information 88 and then to adaptively provide a correction output 153 for improving the positional trace of actuator 56 at correction instants in between lock points of adaptive resonant positioner 50 without substantially affecting lock performance of positioner 50.

FIG. 11 shows the significant functions and waveforms for operation of the resonant agile CW positioner. Two positional traces 156*a* and 156*b* show the same location in two positioner sequential patterns, N and N+1. Adaptive resonant positioner 50 accurately sets the positions $P_n$, $P_{n+1}$, $P_{n+2}$ and $P_{n+3}$ corresponding to pattern selected wavelengths $\lambda_m$, $\lambda_{m+1}$, $\lambda_{m+1}$ and $\lambda_{m+1}$ respectively. Ideally, continuously constant positioning would prevail between $P_{n+1}$ and $P_{n+3}$ by virtue of their identical desired positions. Departure from the ideal at time 161 by an amount represented by 155 is shown exaggerated in pattern N. Pattern N+1, the next pattern, is shown as waveform 156*b*. Error at time 161 in pattern N has been reduced by an open loop sequence 165 for pattern N+1 as will be explained subsequently. Illumination timing pulses 159 on waveform 158 cause actual position data to be generated by sensor 52 for drive control 54 on behalf of the lock requirements at the resonant points $P_n$, $P_{n+1}$ etc. Illumination timing pulses 160 cause actual position data to be generated by sensor 52 for drive sequencer 47*a* for improving the accuracy of the dwell interval. Dwell accuracy correction at time 161 is preferably in the center between pulses 159 where the error is typically greatest but can fall anywhere in between. Rules for multiple corrections in between pulses 159 will also be described. Resonant drive 90 generated by drive control 54 is shown for pattern N and N+1 as waveforms 164*a* and 164*b* respectively. Correction drive 153 resulting from the error at time 161 is shown as waveform 165 along with summed drive waveform 167 on line 90*b*. For reference, the equivalent actuator motion 166 is shown that would result if only the correction drive were applied to the actuator. FIG. 11 shows a dwell error for only the interval between $P_{n+1}$ and $P_{n+2}$ for simplification, in general such errors occur and, can be corrected, between all resonant lock points including the transitional ones such as from $P_n$ to $P_{n+1}$.

In summary, pattern memory means 101 initially or dynamically receives and stores information defining a pattern of one to any practical number of resonant positions to which a resonantly movable load (preferably rotary actuator 56, or alternately a linear armature) is desired to move and pause. For CW/pulse burst operation the pattern includes groups of two or more adjacent identical positions such that the moveable load would remain substantially stationary for a dwell duration of the identical positions in the pattern. Desired correction positions fall in between the desired resonant positions and define the position and instants for which drive sequencer 47*a* must lock, in order to correct the positioner trace in between resonant positions. In sequence with the execution of the pattern resonant positioning, pattern memory means 101 provides correlated current desired correction position data 148*a* to error determining means 100. Actual position signals are received on input line 88 by error determining means 100. Error determining means 100 calculates the error or difference between the actual and desired positions of the actuator 56 at the predetermined correction instants, and outputs a position error signal on line 151 to open loop sequence computation 102*a*.

Open loop sequence computation 102*a* also receives, on line 149 from pattern drive memory 103, the corresponding open loop drive sequence attributable to the current pattern, which was used when the load positioned within that dwell interval. It then uses the position error and open loop sequence signal 149 to modify the open loop sequence for later moving the load during the dwell interval. This information is not used to refine the position of the actuator in the current pass through a given dwell interval. Open loop sequence computation 102*a* writes the modified open loop sequence through line 147 to pattern drive memory 103 for use during the cycle of movements through a subsequent pattern of positions and dwells defining a set of drives to drive the load closer to its desired correction positions.

The magnitude of the position error is a measure of the amount of drive change that should take place. One simple method of modifying the drive sent back to pattern drive memory 103 on line 147 is to increment or decrement the drive by a small amount depending on the polarity of the error. This preferable technique is stable but in some cases may be slow in "learning" the correct value because it increments or decrements only once per pattern. A computation from the error using the model of the actuator/load, the previous drive from line 149 and the form of the closed loop sequence is more complex but can "learn" much faster.

Figure 12:
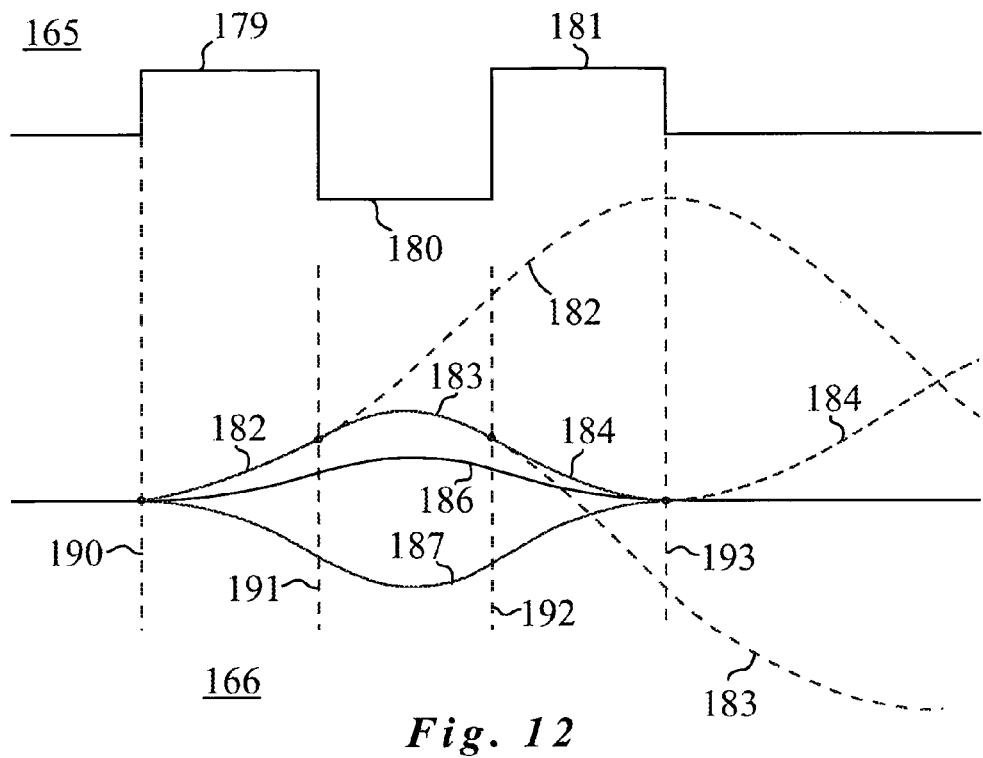
FIG. 12 is a graph showing details of a preferred form of a correction drive and resulting equivalent actuator motion for the first preferred embodiment of FIG. 7.

Open loop sequence drive algorithm shapes to satisfy the requirements of the error shown in FIG. 11 at time 161, for a resonant actuator load, can take many forms, some of which depend on required accuracy and the shape of the departure from a constant position in the uncorrected drive trace. A preferred correction drive sequence is shown in FIG. 11 as waveform 165. It meets the required boundary condition of beginning and ending with zero position change and velocity. It produces the equivalent actuator motion shown as 166. The relationship between drive and positional motion has been fully disclosed in related U.S. Pat. No. 5,450,202 and otherwise follows simple laws of mechanics. The preferred low loss, linear torque/angle motor and linear flexure "return spring" result in a highly undamped second order equation. FIG. 12 shows for a preferable high Q actuator 56, how a preferred correction drive generates the corresponding equivalent positioner trace. The relative complexity of dealing with segments of equations and the ease of using simulations make it preferable to use the latter in defining open loop sequences for particular applications.

For times up to 190 in FIG. 12, correction drive 153, actuator position and velocity are zero. During a first sequence pulse 179 of correction drive 165, output correctional trace 166 follows trace 182. At time 191, position and velocity are a nominal value and drive switches to its negative value 180. Drive pulse 179, if it had continued, would produce the dashed output 182. Instead the output trace is responsive to drive pulse 180 and follows output trace 183, determined by initial conditions matching those at time 191. At time 192, drive again switches to its positive pulse value 181. Output correctional trace abandons the dashed curve 183 and responds with output 184 which again must meet the initial condition match at time 192. At time 193 correction drive 165 switches to zero and actuator position, velocity and drive return to zero meeting the required boundary conditions for independence with adaptive resonant positioner 50.

Figure 13:
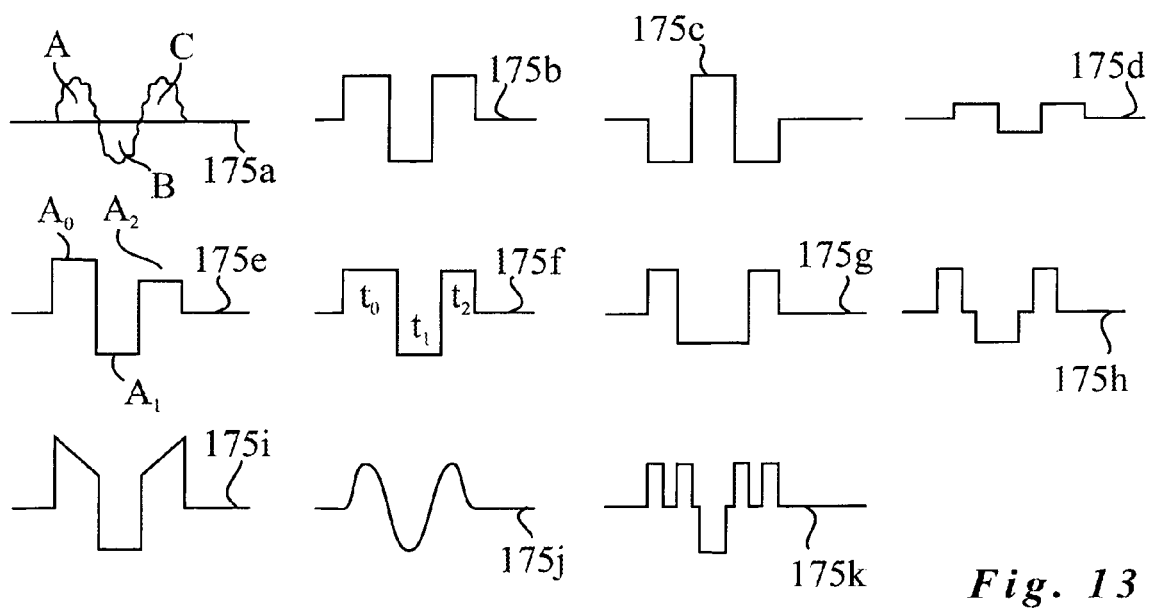
FIG. 13 is a diagram of members of a set of open loop sequence formats for the first preferred embodiment.

FIG. 13 shows members of a set of open loop sequences of which modifications and adaptations within the scope of the invention would occur to those skilled in the art. In FIG. 13, waveform 175b represents the open loop sequence just discussed as 165 in FIG. 11. Reversing the polarity as in 175c, causes the equivalent actuator motion shown as waveform 187 in FIG. 12. A smaller pulse set as in 175d, would produce the reduced amplitude waveform 186. Thus given an open loop sequence design meeting the boundary conditions, loop closure around the open loop sequences can be easily accomplished by modulating the magnitude and polarity of the open loop sequence set. FIG. 13 waveform 175a is a generic view of these open loop sequences. Region A, for a positive sequence, needs generally positive pulse, pulses or analog shapes to produce, say, positive velocity and position change. Region B needs generally negative pulse, pulses or analog shapes to slow the actuator and reverse the velocity, somewhere reaching the peak corrected position. Region C needs generally positive pulse, pulses or analog shapes to return the negative velocity to zero at the point when the position change also returns to zero. Waveform 175e is a case for finite Q actuators where amplitudes $A_0$, $A_1$ and $A_2$ are in the ratio of $R^{-1/3}$, $R^{-1/6}$ and R respectively where R is the amplitude ratio, less than 1, of adjacent periods of a decaying actuator transient response. Similarly, waveform 175f is a case for finite Q actuators where intervals $T_0$, $T_1$ and $T_2$ are in the ratio of $R^{-1/3}$, $R^{-1/6}$ and R. Sequences 175g through 175k are other forms.

Since errors due to the second harmonic are likely to be much larger than those due to the third or forth, the preferable timing location for the feedback loop correction instants is in the center between the resonant positioner lock points shown as time 161 and 163 in FIG. 11. Other locations and even multiple correction instants in between lock points would fall within the intended scope of this invention. For the multiple correction instants case, boundary conditions on the actuator motion must be met such that each new correction must be a zero position and velocity point for the other open loop sequences. FIG. 11 waveform 168 shows the equivalent corrected actuator motion of an example of a second correction at time 169.

Pattern drive memory 103 stores modified open loop sequence information for output during a subsequent pattern as a correction drive signal 152 and amplification by drive means 105 to produce a correction drive 153. Drive 153 is added in drive current adder 106 to the adaptive resonant positioner 50 resonant drive 90 to produce actuator drive 90b on an output line for actuator 56. The error 155 at time 161 in pattern N of waveform 156a is reduced in pattern N+1 waveform 156b at time 163.

Figure 14:
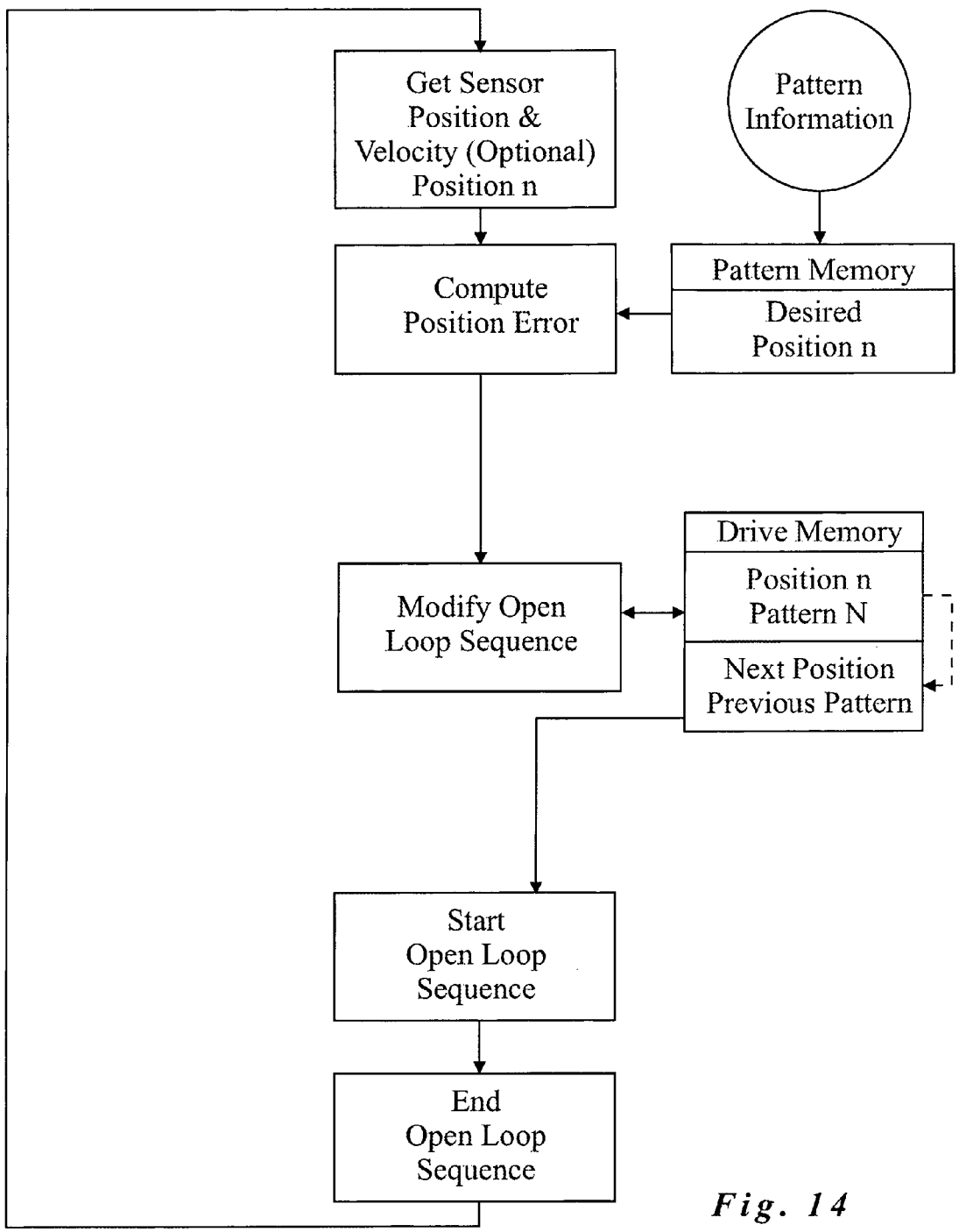
FIG. 14 is a flow chart describing the operation of the first preferred embodiment of FIG. 7.

The flowchart of FIG. 14 summarizes steps in the first preferred embodiment. This flow chart is similar to FIG. 6 for the general case except modified such that all cycles are adaptive. Additional details of drive memory addressing are shown. This feedback loop is active on correction values and therefore position values in the flow chart refer to correction positions. Modification of the drive for the current position and pattern are based on the current position error and open loop sequence used. Drive values for the next position come from the modified correction open loop sequence stored in a previous pattern.

Figure 15:
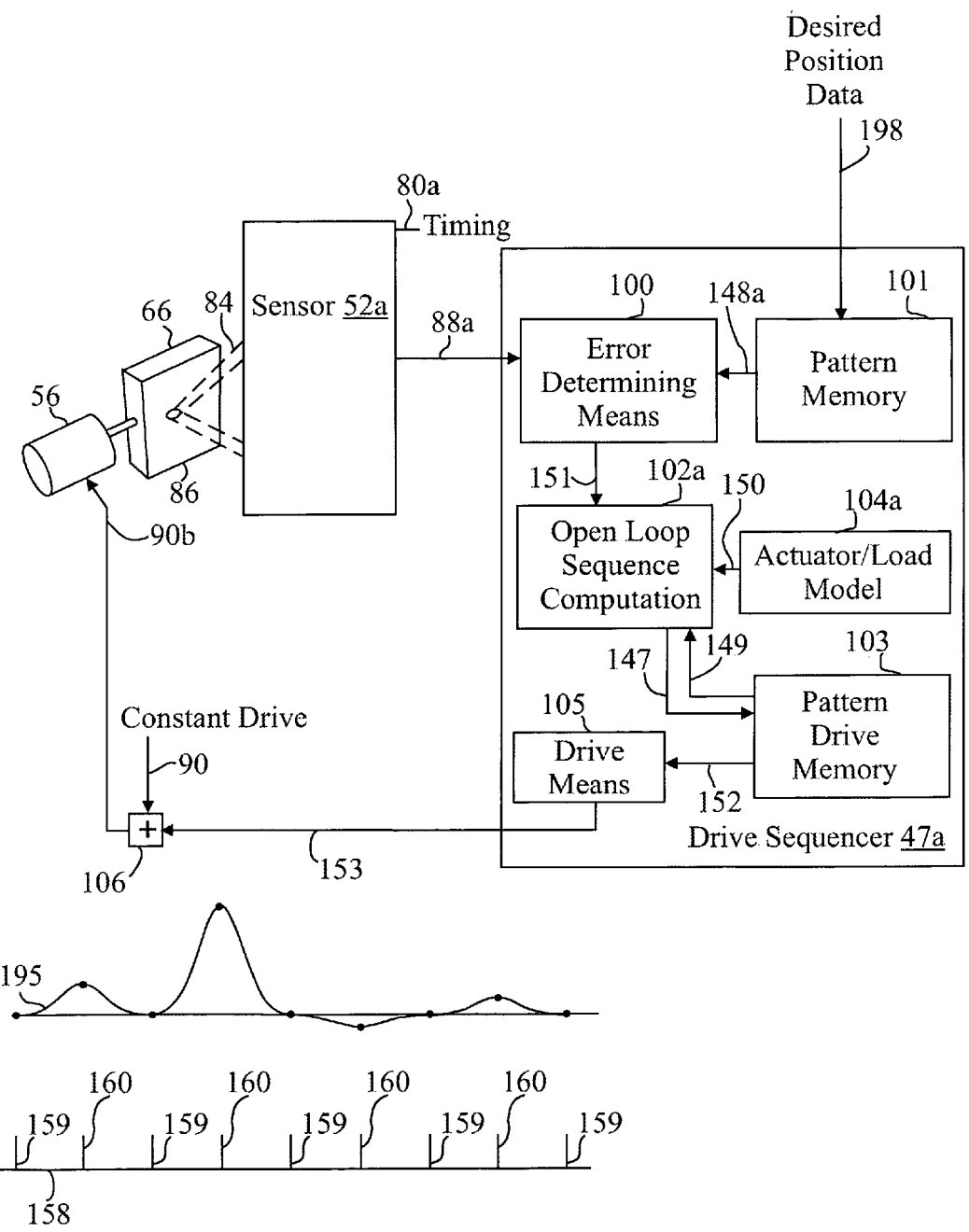
FIG. 15 is a diagram with pertinent waveforms of an alternate of the first preferred embodiment.

FIG. 15 shows an alternate embodiment based on the positioner of FIG. 7. This embodiment, for pulse lasers and not suited for CW operation, comprises a drive sequencer 47a, actuator 56, load means 66, sensor 52a and adder 106 shown symbolically. In this embodiment each open loop sequence is operative to adaptively lock as described in the first preferred embodiment except that the adaptive resonant positioner 50 is not operative and the actuator at the lock points of the first preferred embodiment is left substantially undeflected as indicated by adder 106 input 90 at constant drive. FIG. 15 waveform 158 shows the illumination timing pulses on line 80a for non-functional adaptive resonant positioner lock points 159 and drive sequencer 47a lock points 160. Positioning trace is shown as waveform 195.

Actuator

The techniques of this and other embodiments of this invention depend to a high degree on the motion predictability of the actuator/load in the open loop sequences, and therefore must preferably exhibit tight actuator/load coupling, accurate torque predictability, high repeatability and low friction, backlash, and hysteresis. Resonant actuators such as actuator 56 preferably use flexures or springs in place of bearings for axis definition and therefore have the highest possible repeatability, no backlash, small but predictable losses and consistent resonant frequency.

(C) Non-adaptive Non-resonant Agile CW Positioner

System

Figure 16:
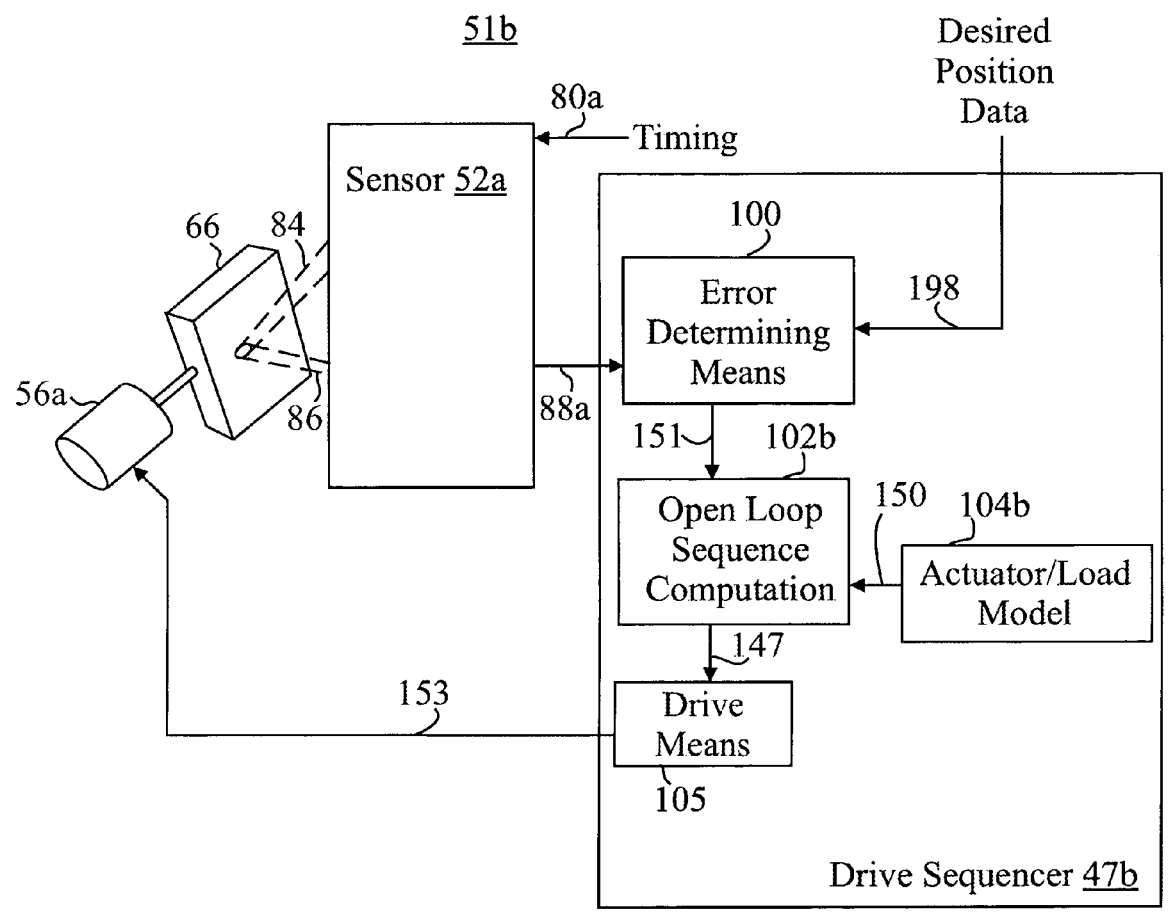
FIG. 16 is a diagram of a second preferred embodiment of the present invention.

Referring to FIG. 16, an agile positioning system 51b according to the present invention in a second preferred embodiment includes an alternate sensor 52a, a drive sequencer means 47b, a source of desired position data 198, an actuator means 56a and a load means-66, typically an intracavity mirror. Actuator means 56a is preferably a galvanometric actuator including a substantially non-resonantly moveable armature with attached optical reflector. The position of typical intracavity mirror 66, by means of its rigid connection to actuator 56a, is preferably sensed by alternate sensor means 52a causing emitted light beam 84 to be reflected off of sensor mirror 66 and to return as reflected light beam 86, responsive to the angle of optical reflector means 66, to sensor means 52a. With system timing set by illumination timing signal 80a, sensor means 52a detects the position of reflected beam 86 and responsively produces an actual interpolated position signal on line 88a. Drive sequencer 47b receives desired position data 198 representing real time or preprogrammed sequences of actuator positions to be periodically visited, actual position data 88a and outputs drive 153 to actuator 56a.

Alternate Sensor

Sensor 52a, disclosed under the first preferred embodiment, receives illumination timing signal 80a and is operative to freeze optical reflector means 66 position and output interpolated actual position on 88a. In a typical system, timing of sensor 52a operation is synchronized with drive sequencer 47b position measuring requirements. Actual position signals are preferably provided by sensor means 52a, but could alternately be provided by resistive, capacitive, inductive, or other types of optical or non-optical sensors.

Drive Sequencer

Referring to FIG. 16, a second preferred drive sequencer 47b comprises a drive means 105, error determining means 100, actuator/load model means 104b and open loop sequence computation means 102b. Error determining means 100 receives desired position data 198 defining a position (or sequentially a pattern of positions) to be visited by optical reflector 66 and actual position data 88a and supplies position error 151 to open loop sequence computation 102b. Open loop sequence computation 102b inputs actuator/load model information 150 from actuator/load model means 104b, position error 151 from error determining means 100 and outputs open loop sequence drive 147 to drive means 105. Drive means 105 receives open loop sequence drive 147 and outputs actuator drive 153 to actuator 56a.

In operation, the non-resonant agile CW positioner 51b of FIG. 16, a second preferred embodiment of the present invention, accurately and rapidly positions an optical reflector in a non-adaptive manner suitable for tuning a laser for CW or pulse burst operation. The positioner is operative in one or more positioner cycles for each position consisting of a sensor measurement followed by an open loop sequence move of the actuator. By utilizing positioner cycles consisting of the short aperture time measurement by a preferable CCD sensor followed by an open loop drive sequence, maximum utilization of torque, minimum transition time and control of the transition profile occurs without slowing the positioner down for feedback loop stability. High gain loop closure around the open loop sequences is operative when the actuator load is substantially at rest or in equilibrium thus isolating the sensor delay from loop stability issues.

Drive sequencer 47b is operative to receive desired position information 198, defining a position to be visited by optical reflector 66 and actual position data 88a and supplies position error 151 to open loop sequence computation 102b reflecting the difference between desired and actual positions of the load. Within each positioner cycle sensor 52a is operative via system timing 80a, while optical reflector 66 is substantially stopped, to freeze, read out and compute its position 88a at the moment of system timing 80a. Error determining means 100 subtracts or otherwise computes the positional error valid at the time of system timing 80a, not however substantially different from the post processing moment when actual position signal 88a is available since reflector 66 was substantially stopped. Using preferably predictable characteristics of the actuator and reflector load from model 104b on line 150, an open loop sequence move ideally correcting for the computed error is computed. Said move executed via line 147, drive means 105 line 153 and actuator 56a. Boundary conditions for the open loop sequence move are that the actuator substantially begins and ends with zero velocity and is designed to produce a net positional change equal to the computed error 151. During this move, sensor 52a and error determining means 100 are not active to preserve the independence necessary for stability without compensation.

Figure 17:
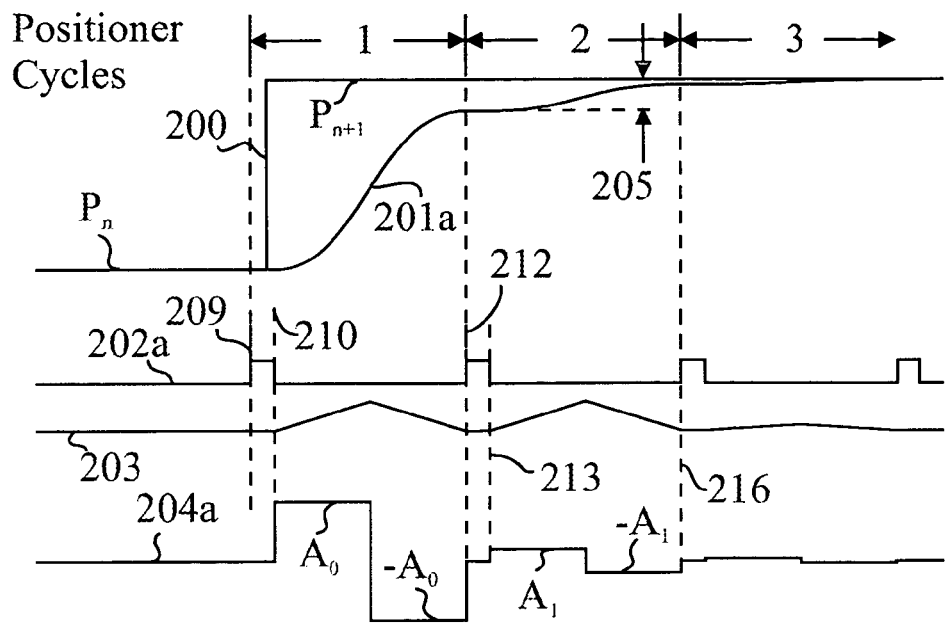
FIG. 17 is a graph showing a positional transition example containing a dwell interval implemented with the second preferred embodiment of the present invention of FIG. 16 including cases for constant and algorithmic sequence width and for velocity compensation.
Figure 17:
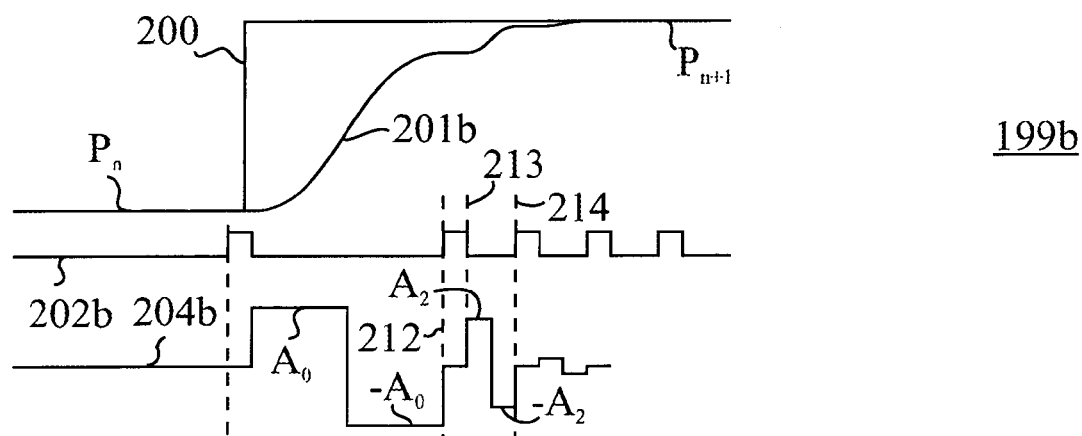
Figure 17:
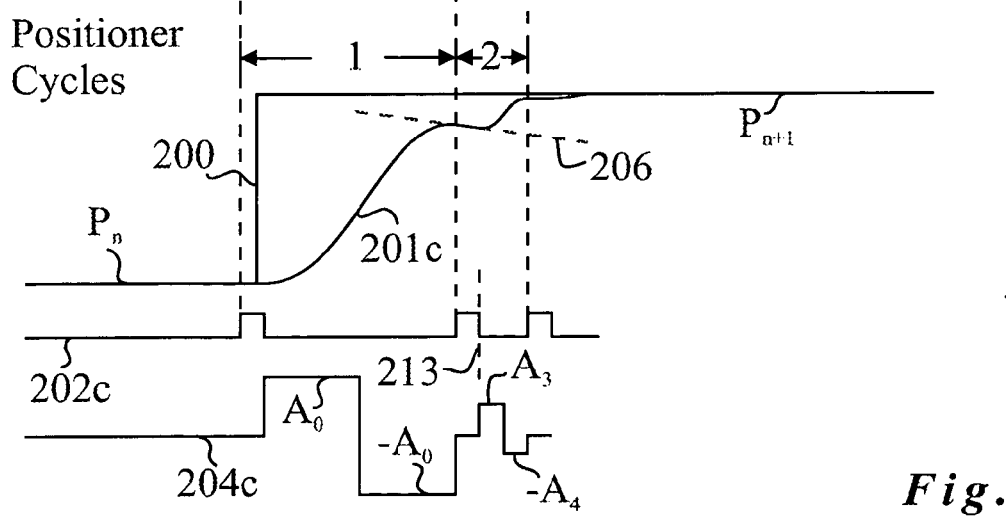

FIG. 17 waveform set 199a shows the significant functions and waveforms for operation of the second preferred embodiment. Waveform 200 represents a desired position step between position $P_n$ and $P_{n+1}$. In the application of a CW tuner, for instance, this would represent a wavelength change, possibly one step in a continuing sequence of input steps. Waveform 202a shows sensor timing as a series of pulses representing the activity of the sensor 52a. Positioner cycle 1 is the time interval from time 209 to time 212. At time 209, with reflector 66 stabilized at position $P_n$, sensor 52a freezes the position but readout takes until time 210, the end of the sensor activity pulse, for the information to be available on sensor 52a output 88a. By time 210 desired position data 198 has transitioned to position $P_{n+1}$ and error determining means 100 computes an error of $(P_{n+1}-P_n)$. Because the positioner was substantially stationary from time 209 to 210, the position at time 210 is still substantially valid even though the data was frozen at time 209. A preferred open loop sequence 204a from time 210 to time 212 results from this error and consists of a positive and negative pulse of torque amplitude $A_0$. The preferably constant torque results in the triangular velocity curve 203 and the position trace 201a, shown with an exaggerated terminating error 205 for explanation purposes. Boundary conditions on this move are that velocity is substantially zero at time 210 and time 212, and the position change, ideally matches the error $(P_{n+1}-P_n)$. Position cycle one is now complete. At time 212 sensor 52a freezes reflector 66 position and reads/interpolates until time 213, while reflector is again substantially at rest. Error 205 at time 213 similarly results in the next open loop sequence, two pulses of amplitude $A_1$ between times 213 and 216. This process repeats continuously in positioner cycles of sensor output paired with open loop sequences. For this version of the second preferred embodiment, a fixed positioner cycle is used. Thus the sensor 52a output 88a, alternating with open loop sequences, occur continuously at a typically fixed rate.

Figure 18:
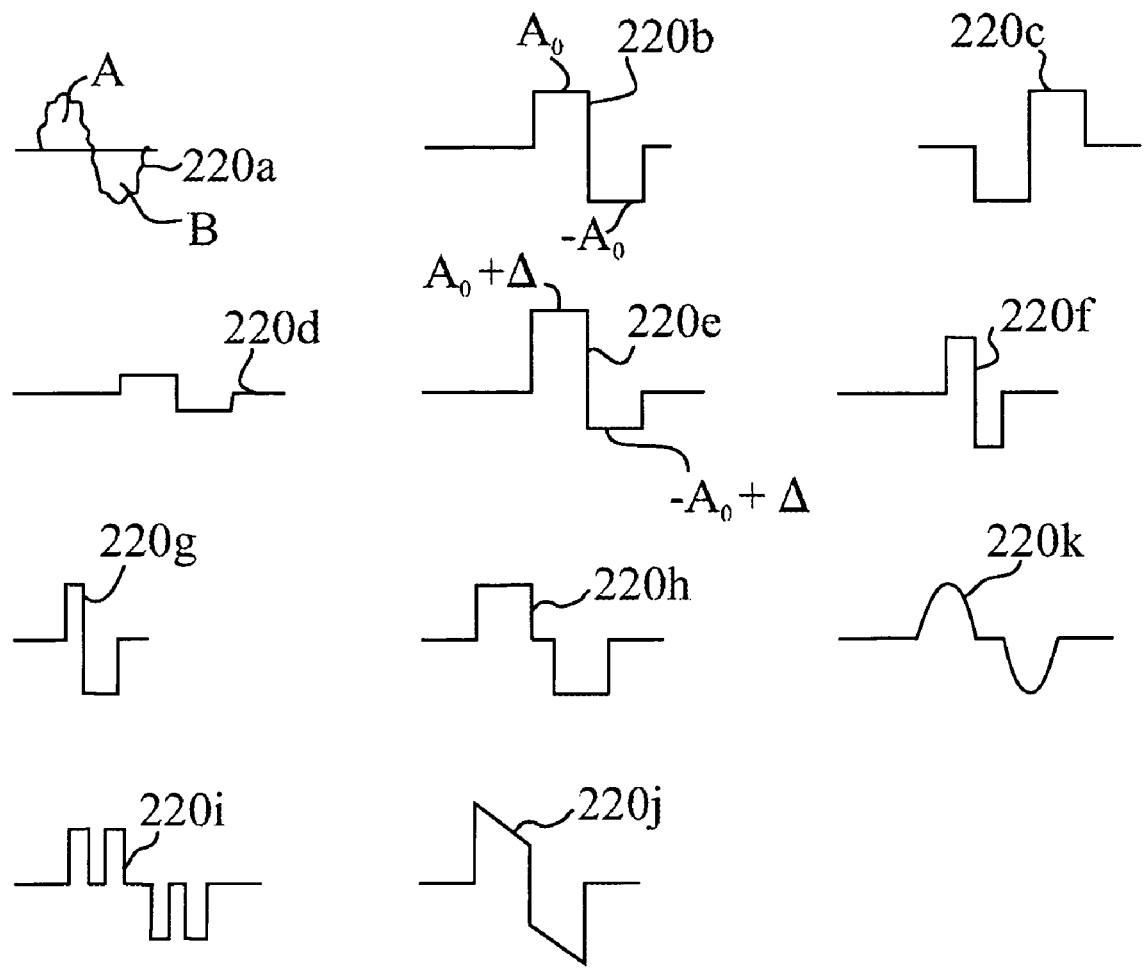
FIG. 18 is a diagram of members of a set of open loop sequence formats for the second preferred embodiment of FIG. 16.

Open loop sequence drive algorithms to satisfy the requirements of the error in FIG. 17 at times 210 and 213 can take many forms, some of which depend on required accuracy and desired transition shape. In any case the sequence must meet the required boundary condition of zero terminal velocity and a transition matching the error 151 measured. FIG. 18 shows members of a set of open loop sequences of which modifications and adaptations within the scope of the invention would occur to those skilled in the art. Waveform 220b represents the open loop sequence just discussed as 204a in FIG. 17. Similar in concept to that discussed relative to FIG. 13, a reverse polarity error requires waveform 220c and a smaller correction, waveform 220d. Thus given an open loop sequence design meeting the boundary conditions, loop closure around the open loop sequences can be easily accomplished by modulating the magnitude of the open loop sequence set. FIG. 18 waveform 220a is a generic view of these open loop sequences. Region A, for a positive sequence, needs generally positive pulse, pulses or analog shapes to produce positive velocity and positive position change. Region B needs generally negative pulse, pulses or analog shapes to slow the actuator and drive the velocity back to zero at the point when the total position change matches the error correction intended. The difference in conceptual form between the waveforms of FIG. 13 and FIG. 18 is due to the return spring of the resonant actuator and follows directly from clasical mechanics.

Open loop sequence computation proceeds from position error 151 and the actuator/load model. The actuator/load model 104b preferably includes torque constants and actuator/load moment of inertia but for increased transition speed may include other factors such as torque versus position function, friction and hysteresis. The constants in the open loop sequence computation also depend on driver (torque) rise time limited in practical implementations because of actuator inductance or capacitance and driver voltage capability. The specific open loop sequence drive format such as those in FIG. 18 also enter into the computation. The relative complexity of dealing with equations and the ease of using mechanical simulations make it preferable to use the latter in determining equation constants for open loop sequences for particular applications. Loop closure speed is closely related to the accuracy with which the open loop sequence produces the desired position change. For a 2% prediction accuracy using model 104b, the 2% error after completion of the first positioner cycle, in FIG. 17 approaches 0.04% at time 216 at the end of the second positioner cycle. From classical mechanics the form of the equation for predicting amplitude $A_0$ in a preferred pulse format of waveform 204a in FIG. 17 is:

$$A_0 = K_1 * \text{position\_error}$$

where $K_1$ is a constant involving system and pulse characteristics as discussed.

Faster transitions can be achieved with the second preferred embodiment by using an algorithmic positioner cycle interval as opposed to the fixed cycle above. Following a step in the desired position data, the first positioner cycle reduces the error to substantially zero because of the high accuracy of the model. The second positioner cycle can use a shorter open loop sequence interval resulting in both a higher speed transition and better torque utilization since the required torque increases as the square of this reduction for a given positional transition. FIG. 17 waveform set 199b is an example. The first positioner cycle up to time 212 is the same as for waveform set 199a as a result of torque pulses $A_0$. Sensor timing 202b and drive waveform 204b between time 212 and 214 accomplish the next open loop sequence in a shorter time. For an open loop sequence in ¼ of the time, drive amplitude $A_2$ would nominally be 16 times higher than drive amplitude $A_1$. Waveform 204b is drawn representative and not to scale. In a typical positioner, the position error for the second positioner cycle would be only a few percent of full scale maximum. Assuming a reduction in sequence interval of M to 1, the corresponding form of the equation for predicting amplitude $A_2$ for the preferred pulse format of waveform 204b in FIG. 17 is:

$$A_2 = M^2 K_2 * \text{position\_error}$$

where $K_2$ is a constant involving system and pulse characteristics as discussed.

Other timing variations, for instance open loop sequence intervals each related to its error or pulse width modulation, would fall under the scope of this invention.

Actuator/load modeling imperfections can result in non-zero velocity as well as position error at the end of one positioner cycle. FIG. 17 waveform set 199c shows an implementation with velocity compensation. Sensor 52a is programmed to measure two adjacent actual positions 88a for computing velocity. Thus at time 213, at the trailing edge of the sensor activity pulse of waveform 202c, both position error and velocity are available. Velocity is indicated by the slope of dashed line 206. In this case unequal sequence pulses are required to correct for the velocity. Still assuming a reduction in sequence interval of M to 1, the corresponding form of the equation for predicting amplitudes $A_3$ and $A_4$ for the preferred pulse format of waveform 204c in FIG. 17 is:

$$A_3 = M^2 K_3 * (\text{position\_error} - \text{velocity} * K_4/M) - \text{velocity} * K_5 * M$$

and, $$A_4 = M^2 K_3 * (\text{position\_error} - \text{velocity} * K_4/M) + \text{velocity} * K_5 * M$$

where $K_3$, $K_4$ and $K_5$ are constants involving system and pulse characteristics as discussed.

In these examples, position error was shown as always positive resulting in closed loop undershoot, obviously the same concepts hold for negative position error and closed loop overshoot.

FIG. 18 shows other possible formats for the open loop sequences. Waveform 220e shows velocity correction, waveform 220f is a pulse width modulation version of waveform 220d, waveform 220g is a velocity corrected version of waveform 220f and 220h through 220j are other formats.

Figure 19:
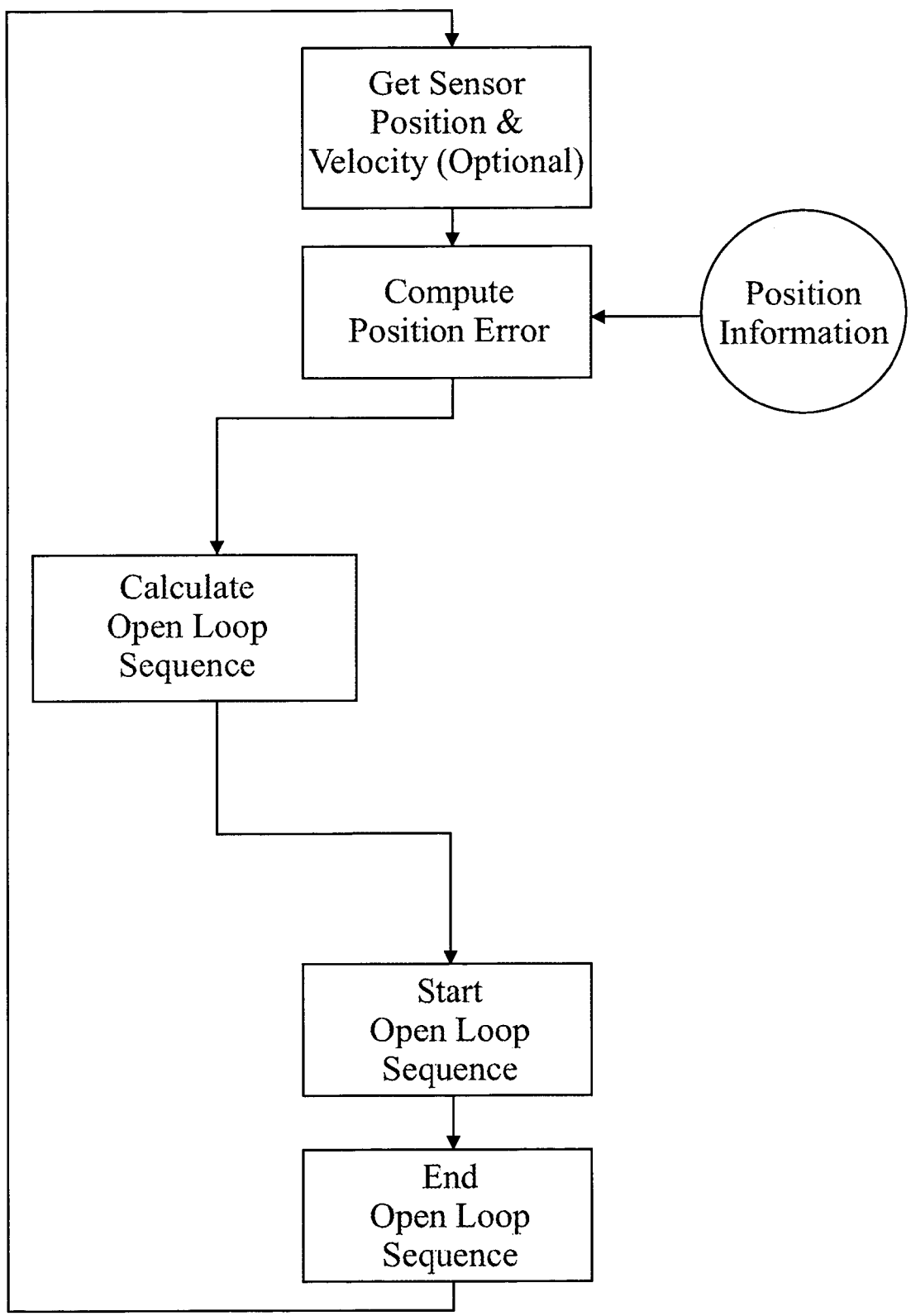
FIG. 19 is a flow chart describing the operation of the second preferred embodiment of FIG. 16.

FIG. 19 is a flow chart describing the operation of the second preferred embodiment of FIG. 16. This flow chart is similar to FIG. 6 for the general case except modified such that all cycles are non-adaptive. No drive memory is required.

Actuator

The techniques of this and other embodiments of this invention depend to a high degree on the motion predictability of the actuator/load in the open loop sequences, and therefore must preferably exhibit tight actuator/load coupling, accurate torque predictability, high repeatability and low friction, backlash, and hysteresis. Non-resonant actuators cannot use return springs or flexures to define the rotational axis and thus typically must use bearings with attendant increased friction plus other degrading characteristics, resulting in somewhat reduced performance even for high quality bearings.

(D) Adaptive Non-resonant Agile CW Positioner

System

Figure 20:
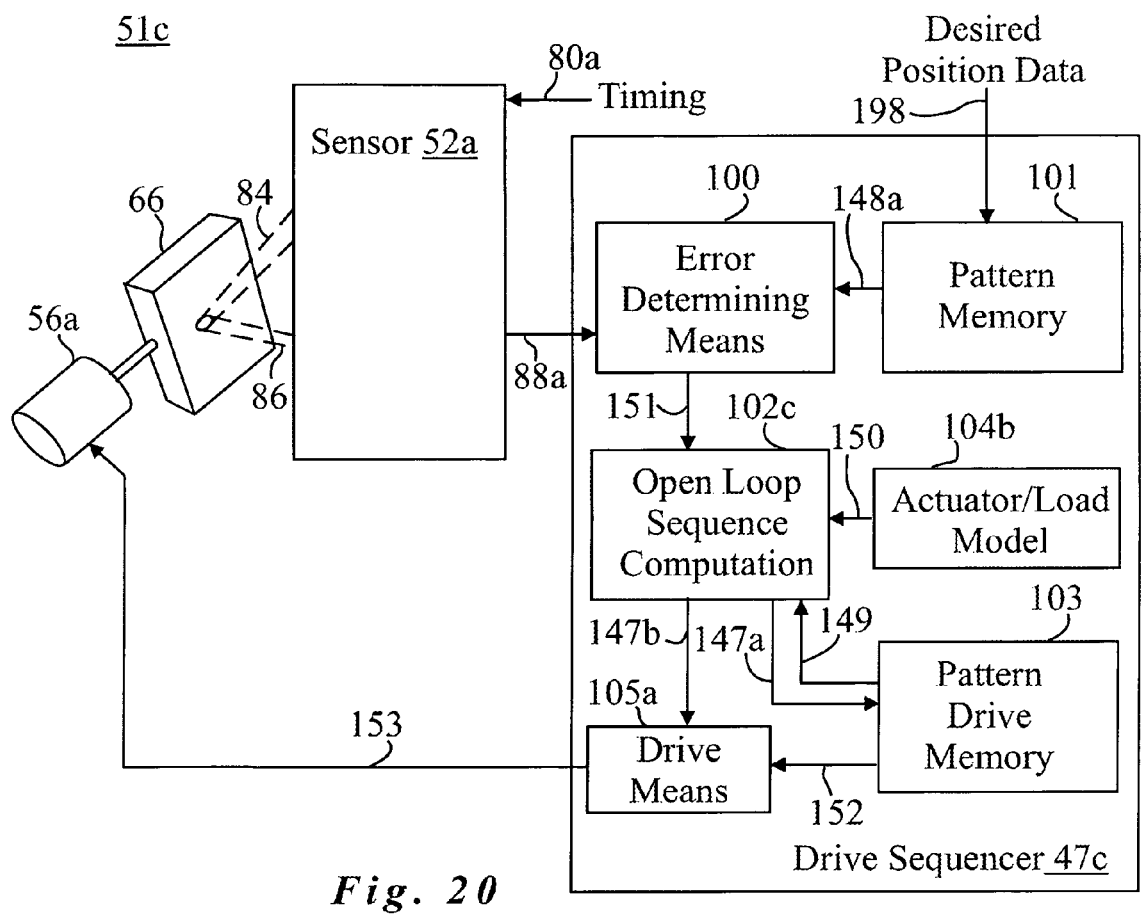
FIG. 20 is a diagram of a third preferred embodiment of the present invention.

Referring to FIG. 20, an agile positioning system 51c according to the present invention in a third preferred embodiment includes an alternate sensor 52a, a drive sequencer means 47c, a source of desired position data 198, an actuator means 56a and a load means 66 typically an intracavity mirror. Actuator means 56a is preferably a galvanometric actuator including a substantially non-resonantly moveable armature with attached optical reflector. The position of typical intracavity mirror 66, by means of its rigid connection to actuator 56a, is preferably sensed by alternate sensor means 52a causing emitted light beam 84 to be reflected off of sensor mirror 66 and to return as reflected light beam 86, responsive to the angle of optical reflector means 66, to sensor means 52a. With system timing set by illumination timing signal 80a, sensor means 52a detects the position of reflected beam 86 and responsively produces an actual interpolated position signal on line 88a. Drive sequencer 47c receives desired position data 198 representing patterns of preprogrammed sequences of actuator positions to be periodically visited, actual position data 88a and outputs drive 153 to actuator 56a.

Alternate Sensor

Sensor 52a, disclosed under the first preferred embodiment, receives illumination timing signal 80a and is operative to freeze optical reflector means 66 position and output interpolated actual position on 88a. In a typical system, timing of sensor 52a operation is synchronized with drive sequencer 47c position measuring requirements. Actual position signals are preferably provided by sensor means 52a, but could alternately be provided by resistive, capacitive, inductive, or other types of optical or non-optical sensors.

Drive Sequencer

Referring to FIG. 20, a third preferred drive sequencer 47c comprises a pattern memory 101, a pattern drive memory 103, drive means 105a, error determining means 100, actuator/load model means 104b and open loop sequence computation means 102c.

Pattern memory means 101 receives desired position data 198 defining a pattern of positions to be visited by the actuator. Pattern memory means 101 stores said pattern and supplies a current desired position as output 148a to error determining means 100. Error determining means 100 receives desired position data 148a and actual position data 88a and supplies position error 151 to open loop sequence computation 102c. Open loop sequence computation 102c inputs actuator/load model information 150 from actuator/load model means 104b, position error 151 from error determining means 100, current pattern adaptive open loop sequences 149 from pattern drive memory 103 and outputs next pattern modified adaptive open loop sequences 147a to pattern drive memory 103 and non-adaptive drive 147b to drive means 105a. Pattern drive memory 103 inputs next pattern modified adaptive open loop sequences 147a and outputs current pattern adaptive open loop sequences 149 to open loop sequence computation 102c and outputs previously stored adaptive open loop sequences 152 to drive means 105a. Drive means 105a inputs non-adaptive drive 147b from open loop sequence computation 102c, previously stored adaptive open loop sequences 152 from pattern drive memory 103 and outputs actuator drive 153 to actuator 56a.

In operation, the adaptive non-resonant agile CW positioner 51c of FIG. 20, a third preferred embodiment of the present invention, provides accuracy and speed enhancements to the second preferred embodiment by using delayed feedback corrections to adaptively take advantage of constant or relatively unchanging sets of positions being repeated in patterns. When the second preferred embodiment of the present invention operates on real time or pre-programmed patterns of positions, imperfections within the modeling of the actuator/load/driver cause the first few transitions to a new wavelength to be inaccurate. This error is repeated anew each time the positioner passes through the pattern. The third preferred embodiment is operative in one or more positioner cycles of sensor actual position measurement together with an open loop sequence for each position of a pattern. One or more positioner cycles, preferably the first, in each position is an adaptive positioner cycle. The remaining are non-adaptive positioner cycles. Thus each positioner cycle within each pattern position is either adaptive or non-adaptive. This adaptation transitions faster to required accuracy within a pattern position, enabling the use of shorter dwell times including even a single positioner cycle. With this embodiment, high tuning rate CW, multipulse and even single pulse lasers tuners are practical.

Pattern memory means 101 initially or dynamically receives and stores information defining a pattern of one to any practical number of positions to which a movable load (preferably rotary actuator 56, or alternately a linear armature) is desired to move and pause. In sequence with the execution of the positions within the pattern, pattern memory means 101 provides correlated current desired position data 148a to error determining means 100. Actual position signals are received on input line 88a by error determining means 100. Error determining means 100 calculates the error or difference between the actual and desired positions of the actuator 56a at predetermined measurement instants within each positioner cycle, and outputs a position error signal on line 151 to open loop sequence computation 102c. Open loop sequence computation means 102c also receives, on line 149 from pattern drive memory 103, the corresponding adaptive open loop sequence which was used when the load positioned in the current adaptive positioner cycle.

In an adaptive positioner cycle, computation means 102c uses the position error 151, actuator/load model 104b on line 150 and the adaptive open loop sequence 149 to calculate a modified open loop sequence drive 147a. The magnitude and polarity of the position error is a measure of the amount of drive change that should take place. This information is stored and not used to refine the actual position of the actuator in the current pass through the current pattern. Open loop sequence computation means 102c writes the modified adaptive open loop sequence drive through line 147a to pattern drive memory 103 for use during the same cycle of the next pattern to drive the load closer to its desired position.

Figure 21:
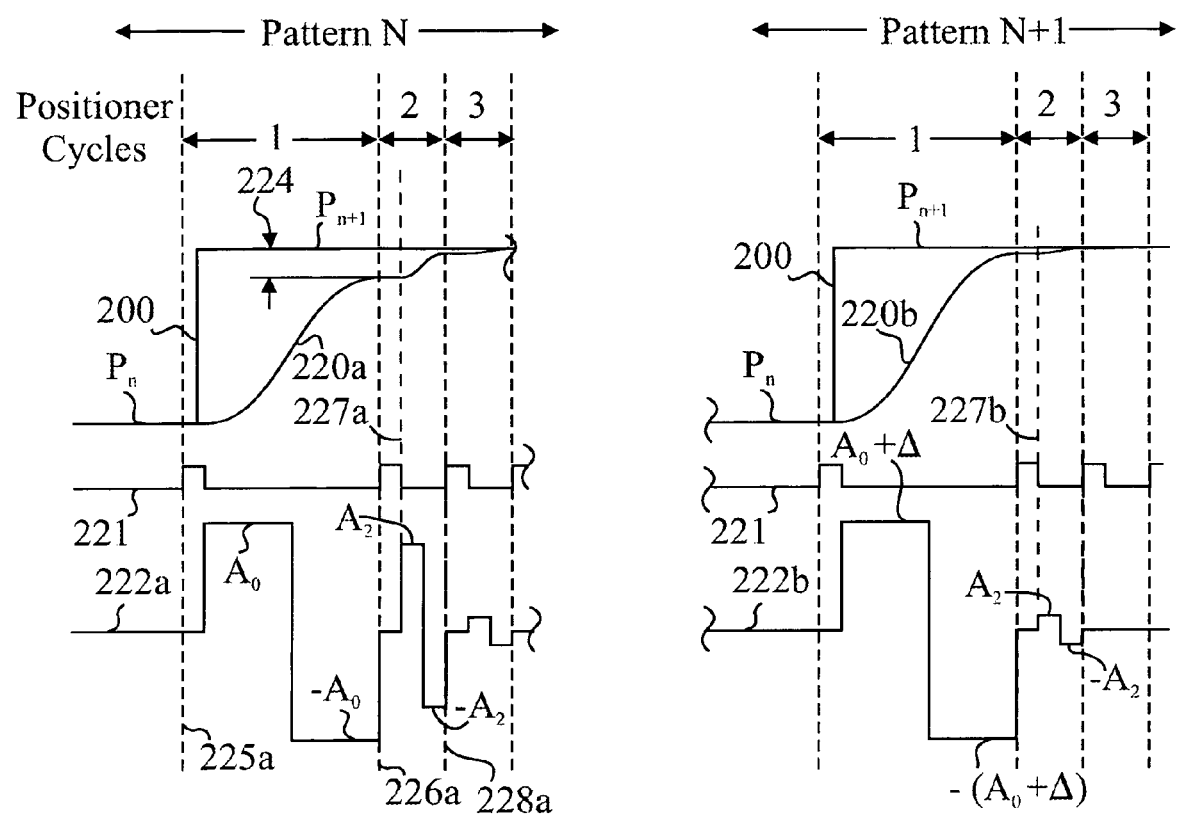
FIG. 21 is a graph showing a positional transition example implemented with the third preferred embodiment of the present invention of FIG. 20.

FIG. 21 shows the significant functions and waveforms for operation of the adaptive non-resonant agile CW positioner based on a preferred open loop sequence format, FIG. 18 waveform 220b. Positioner cycle 1 is an adaptive positioner cycle. Two positional traces 220a and 220b show the same positioner cycle in two sequential patterns, N and N+1. Departure from the ideal at time 227a by an amount represented by 224 is shown exaggerated in pattern N. Positioning for pattern N+1, the next pattern, is shown as waveform 220b. The position error at time 227a in pattern N has been reduced for pattern N+1 by an adaptive calculation for pattern N+1 as will be explained subsequently.

As a result of this error, the drive represented by $A_0$ and $-A_0$, used to arrive at the error 224 at time 227a is read from pattern drive memory on line 149. It is modified and written back into pattern drive memory 103 on line 147a. Modification can take several forms. The simplest, most stable and accurate form is to increment or decrement the drives, as appropriate, with a small value designed to be marginally operative in reducing the error to zero. This method is slow to "learn" the correct drive, requiring many patterns to approach zero error. Also its ability to follow slowly varying patterns is impaired. Another more preferable technique is to compute the change (or part of the change) in $A_0$ and $-A_0$ from the error 151 using the model of the actuator/load 104b on line 150, the current drive used from line 149 and the form of the closed loop sequence. These and intermediate variations and their effect on particular applications would be obvious to one skilled in the art. Since for preferably linear torque/drive actuators, the relationship between position transition and drive magnitude $A_0$ is linear, the correction $\Delta$, for the next cycle can be computed by simple addition using a version of a previously identified formula:

correction $\Delta = K_1 *$ position_error where $K_1$ is a constant involving system and pulse characteristics as discussed.

Drive modification for the cases of algorithmic positioner cycle interval and velocity correction follow in a similarly predictable manor from the equations for the second preferred embodiment. The open loop sequence formats of FIG. 18 are valid for this embodiment as well.

The resulting pattern N+1 with this nominal correction is shown as waveform 220b with reduced error at time 227b. Adaptive error correction in other than the first open loop cycle, in multiple cycles within the same dwell position or less often than once per pattern can be useful and would fall within the spirit and scope of this invention. As an example of a double correction, one adaptive correction could apply between time 225a and 226a in cycle 1 and another between time 226a and 228a in cycle 2. Patterns consisting of only one positioner cycle per position visited, useful for instance in high speed pulse laser applications, would similarly fall within the scope of this invention. Pattern drive memory 103 stores adapted open loop sequence information for output on line 152 and use by drive means 105a to produce an open loop correction drive 153 for actuator 56a.

In a non-adaptive cycle, open loop sequence computation 102c computes a non-adaptive open loop sequence on line 147b to drive means 105a as described for the non-adaptive non-resonant CW positioner of FIG. 16, output 147 of open loop sequence computation 102b. The switch equivalent to select line 152 or line 147b within drive means 105a based on adaptive or non-adaptive positioner cycles is not specifically shown. In summary, non-adaptive cycles flow in real time directly to driver 105a and adaptive cycles adapt via lines 147a and 149 with pattern drive memory 103 and output previously stored adaptive open loop sequences one pattern later via line 152.

Figure 22:
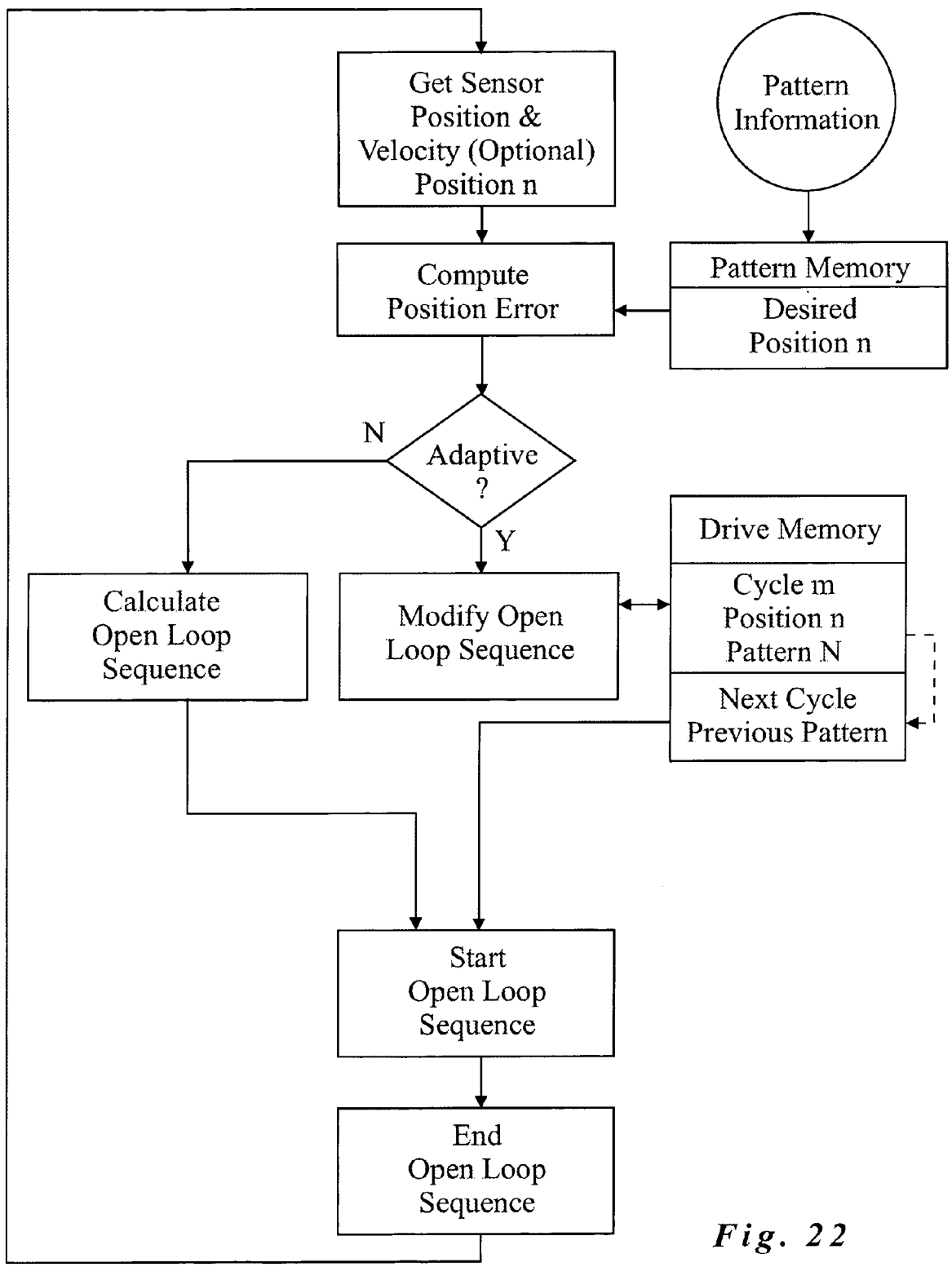
FIG. 22 is a flow chart describing the operation of the third preferred embodiment of FIG. 20.

The flowchart of FIG. 22 summarizes steps in the third preferred embodiment. This flow chart is similar to FIG. 6 for the general case except modified to show details of drive memory addressing. Modification of the drive for the current positioner cycle and pattern are based on the current position error and open loop sequence used. Drive values for the next positioner cycle come from the modified open loop sequence stored in a previous pattern.

Actuator

The techniques of this and other embodiments of this invention depend to a high degree on the motion predictability of the actuator/load in the open loop sequences, and therefore must preferably exhibit tight actuator/load coupling, accurate torque predictability, high repeatability and low friction, backlash, and hysteresis. Non-resonant actuators cannot use return springs or flexures to define the rotational axis and thus typically must use bearings with attendant increased friction plus other degrading characteristics, resulting in somewhat reduced performance even for high quality bearings.

Conclusion, Ramifications and Scope of the Invention

As has been disclosed, this invention derives its advantages by isolating the position sensing function from the driving function. It improves operating speeds for applications where very high accuracy sensors normally result in greatly reduced system speed for stability. Rapid switching to accuracies of a few μradians suitable for intracavity tuning of lasers is accomplished including significant dwell or hold times at each position. The invention also has utility in lower accuracy system when even higher speeds are required. While the invention is aimed at maintaining the isolation between sensor and actuator motion, switching to a slower compensated servo technique after actuator settling, would fall within the scope of this invention.

Tradeoffs regarding preferred system organization and specific selection of hardware would be obvious to one skilled in the art after reading this specification. In some cases, this specification uses less compact and precise organization for ease and clarity of disclosure but should not be construed as a limitation of the invention. Some examples for instance:

1) Analog versus digital implementations are sensitive functions of sensors, actuators, drivers and other hardware but specific allocation for this invention has little operational significance, except where specifically defined.
2) Pattern and pattern drive memories 101 and 103 in a reasonable implementation would be combined and in some cases also with their counterparts in drive control 54. Pattern memory 101 could be eliminated altogether and current desired position data, including patterns, supplied dynamically.
3) Drive memory can store either or both an algebraic value representing the drive or the individual parameters of the open loop sequence. If for instance, pattern drive memory 103 of FIG. 20 stores only algebraic drive values, conversion to open loop sequence waveforms would need to be included in the pattern drive memory for output 152 or in drive means 105a for output 153.
4) In this specification, actual position signals are provided by sensor means 52 or 52a, but could alternately be provided by resistive, capacitive, inductive, or other types of optical or non-optical sensors.
5) Actuator models 104 shown as block functions, could be electronic, software or simply combined with the open loop sequence computation formulas.
6) Actuator drive means, in some cases, contains data selectors in addition to the normal actuator driving function for selecting actuator drive between adaptive and non-adaptive cycles.

It is understood that the invention is not confined to the particular embodiments set forth herein as illustrated, but embraces such modified forms thereof as come within the scope of the following claims as would be obvious to those skilled in the art to which the present invention pertains. Simplified equations have been disclosed for correction techniques, but simulations, improved equations or equations accommodating additional actuator anomalies would fall within the scope of this invention. It is also anticipated that adaptive versions of this invention would not necessarily modify drive values on every pattern.

Although this specification is discussed to a high degree as it pertains to intracavity mirror laser tuners, it should be noted that many other types of applications exist and the claims are not limited to laser tuning. Particularly, positions of a laser output beam steering mirror can be controlled by using one of the embodiments. A piezoelectric type actuator driving a mirror, whose position is sensed, can change the angle of impingement of a laser. Read write head positioning and pyramidal facet error correction of polygons are other uses of this invention. The invention is also useful in many positioner applications not utilizing or requiring a mirror. An OPO crystal used in agile tuning applications can be rotated by one of the embodiments. Alternatively, a diffraction grating can tune a cavity directly without the need for a separate beam steering cavity mirror.

The invention is limited only by the scope of the following claims.

I claim:

1. An agile positioner means responsive to an actual position of a substantially non-resonant load and operative to provide drive control information for driving an actuator means to position said load, comprising:
   (a) sensing means responsive to a substantially stationary load for generating an actual position signal;
   (b) open loop sequence computation means responsive to a desired position and the actual position signal for determining differences between desired and actual positions of said load at one or a plurality of positioner cycles for each said desired position, correction calculation means responsive to said differences for calculating and outputting open loop sequences computed for a boundary state of velocity and position error at an end of the positioner cycle whereby said load moves closer to said desired position and with substantially zero velocity at the end of each positioner cycle; and
   (c) drive means for amplifying the open loop sequences to produce an actuator drive signal on an output line.

2. The Agile positioner means as recited in claim 1 wherein the actuator means is linearly moveable.

3. The Agile positioner means as recited in claim 1 wherein said sensing means comprises an analog sensor.

4. The Agile positioner means as recited in claim 1 wherein the open loop sequence comprises two substantially equal pulses opposite in polarity, of substantially equal width and inverting for opposite correction polarity.

5. The Agile positioner means as recited in claim 1 wherein the open loop sequences comprise two substantially equal pulses opposite in polarity, of substantially constant amplitude, of substantially equal width, occupying a variable width positioner cycle and inverting for opposite correction polarity, whereby the open loop sequences constitute pulse width modulation.

6. The agile positioner means as recited in claim 1 wherein said open loop sequence computation means and said correction calculation means further include a term for a velocity, whereby the positioner is responsive to the velocity of the actuator.

7. The agile positioner means as recited in claim 6 wherein the positioner cycle occupies a constant time interval.

8. The agile positioner means as recited in claim 6 wherein said sensing means includes a digital sensor means for sensing the actual position of an optical element and for responsively providing interpolated actual position signals, comprising:
  (a) lighting means for emitting and focusing a beam of emitted light towards said optical element so that the beam is reflected as a beam of reflected light;
  (b) optical detector means including an array of discrete photodetector elements for detecting an intensity distribution of reflected light in said array and responsively producing detection signals serially forming an intensity sample waveform output from the detector means;
  (c) filter means for reducing high frequency content and forming a filtered waveform from said intensity sample waveform for improved interpolation;
  (d) a threshold logic means for receiving said filtered waveform, comparing said filtered waveform to a reference threshold level, responsively producing a first and second binary envelop waveform representing an interval to a first and a second crossing of the threshold level by the filtered waveform; and
  (e) a counting and averaging means for counting to a value representing a center between the first and the second crossing of the threshold level of the first and the second binary envelope waveform and outputting said total value as said interpolated actual position signal.

9. The agile positioner means as recited in claim 8 wherein said lighting means continuously projects said beam of emitted light.

10. The agile positioner means as recited in claim 8 wherein said lighting means pulses said beam of emitted light.

* * * * *